United States Patent
Watson

(10) Patent No.: US 11,700,415 B2
(45) Date of Patent: Jul. 11, 2023

(54) AUDIO TRANSITIONS WHEN STREAMING AUDIOVISUAL MEDIA TITLES

(71) Applicant: NETFLIX, INC., Los Gatos, CA (US)

(72) Inventor: Mark Watson, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

(21) Appl. No.: 17/746,823

(22) Filed: May 17, 2022

(65) Prior Publication Data
US 2022/0279232 A1     Sep. 1, 2022

Related U.S. Application Data

(63) Continuation of application No. 16/570,880, filed on Sep. 13, 2019, now Pat. No. 11,336,947.

(51) Int. Cl.
| | | |
|---|---|---|
| H04N 21/43 | (2011.01) | |
| G06F 16/783 | (2019.01) | |
| H04N 21/439 | (2011.01) | |
| G06V 20/40 | (2022.01) | |

(52) U.S. Cl.
CPC ..... *H04N 21/4307* (2013.01); *G06F 16/7834* (2019.01); *G06V 20/46* (2022.01); *G06V 20/49* (2022.01); *H04N 21/4394* (2013.01)

(58) Field of Classification Search
CPC ........... H04N 21/4307; H04N 21/4394; H04N 21/845; G06F 16/7834; G06V 20/46; G06V 20/49; G11B 27/031
See application file for complete search history.

(56) References Cited

U.S. PATENT DOCUMENTS

| | | | |
|---|---|---|---|
| 4,430,676 A | 2/1984 | Johnson | |
| 6,181,383 B1 | 1/2001 | Fox et al. | |
| 6,630,963 B1 * | 10/2003 | Billmaier | H04H 20/18 |
| | | | 348/E5.002 |
| 9,082,092 B1 | 7/2015 | Henry | |
| 9,400,555 B2 * | 7/2016 | Quigley | G06F 3/016 |

(Continued)

FOREIGN PATENT DOCUMENTS

| | | |
|---|---|---|
| JP | 2001008157 A | 1/2001 |
| WO | 2019/055275 A1 | 3/2019 |

OTHER PUBLICATIONS

Krishnamoorthi et al., "Quality-Adaptive Prefetching for Interactive Branched Video using HTTP-based Adaptive Streaming", Multimedia, ACM, XP058058715, DOI: 10.1145/2647868.2654951, Nov. 3-7, 2014, pp. 317-326.

(Continued)

*Primary Examiner* — Michael Lee
(74) *Attorney, Agent, or Firm* — Artegis Law Group, LLP

(57) ABSTRACT

A playback application is configured to analyze audio frames associated with transitions between segments within a media title to identify one or more portions of extraneous audio. The playback application is configured to analyze the one or more portions of extraneous audio and then determine which of the one or more corresponding audio frames should be dropped. In doing so, the playback application can analyze a topology associated with the media title to determine whether any specific portions of extraneous audio are to be played outside of a logical ordering of audio samples set forth in the topology. These specific portions of extraneous audio are preferentially removed.

1 Claim, 16 Drawing Sheets

(56) References Cited

U.S. PATENT DOCUMENTS

| | | | |
|---|---|---|---|
| 10,250,937 B2* | 4/2019 | Pantos | H04N 21/4825 |
| 10,638,180 B1 | 4/2020 | Pringle et al. | |
| 10,681,104 B1 | 6/2020 | Wu et al. | |
| 11,503,264 B2* | 11/2022 | Watson | G11B 27/102 |
| 2002/0018645 A1 | 2/2002 | Nakamatsu et al. | |
| 2003/0033325 A1 | 2/2003 | Boogaard | |
| 2004/0096190 A1 | 5/2004 | Uenaka et al. | |
| 2004/0196989 A1 | 10/2004 | Friedman et al. | |
| 2004/0226035 A1 | 11/2004 | Hauser, Jr. | |
| 2008/0062998 A1* | 3/2008 | Kim | H04N 21/64707 370/395.64 |
| 2008/0075417 A1 | 3/2008 | Mizuno | |
| 2011/0138433 A1* | 6/2011 | Whiteing | H04N 5/602 348/E7.001 |
| 2011/0150099 A1 | 6/2011 | Owen | |
| 2013/0129302 A1 | 5/2013 | Meadowcroft et al. | |
| 2013/0159004 A1 | 6/2013 | Hoerich | |
| 2014/0118468 A1* | 5/2014 | Purdy | H04N 7/141 348/14.08 |
| 2014/0230631 A1* | 8/2014 | Wieder | G10H 1/0033 84/609 |
| 2014/0354434 A1 | 12/2014 | Lalonde | |
| 2015/0039302 A1* | 2/2015 | Jarvinen | G10L 17/18 381/17 |
| 2016/0012857 A1* | 1/2016 | Leppänen | G11B 27/32 386/241 |
| 2016/0322054 A1 | 11/2016 | Bloch et al. | |
| 2017/0013329 A1 | 1/2017 | Um | |
| 2017/0062006 A1 | 3/2017 | Plom et al. | |
| 2018/0218749 A1 | 8/2018 | Fejgin et al. | |
| 2018/0218756 A1 | 8/2018 | McIntosh et al. | |
| 2019/0028525 A1 | 1/2019 | Kansara | |
| 2019/0215542 A1 | 7/2019 | Gandhi et al. | |
| 2020/0314496 A1* | 10/2020 | Wittke | G06F 3/165 |

OTHER PUBLICATIONS

Notice of Allowance received for U.S. Appl. No. 16/570,940 dated Jul. 7, 2022, 16 pages.

* cited by examiner

AUDIO TRANSITIONS WHEN STREAMING AUDIOVISUAL MEDIA TITLES

CROSS-REFERENCE TO RELATED APPLICATIONS

This application is a continuation of U.S. patent application titled, "AUDIO TRANSITIONS WHEN STREAMING AUDIOVISUAL MEDIA TITLES," filed on Sep. 13, 2019, and having Ser. No. 16/570,880. The subject matter of this related application is hereby incorporated herein by reference.

BACKGROUND

Field of the Various Embodiments

Various embodiments relate generally to computer science and, more specifically, to improved audio transitions when streaming audiovisual media titles.

Description of the Related Art

A video streaming service is typically designed to provide users with access to one or more libraries of various media titles. To access a given media title, a user usually connects to the video streaming service via an endpoint device, such as a laptop computer, smart television, tablet computer, or similar device. The user can then select the given media title via a graphical user interface (GUI) that is displayed on the endpoint device and configured to allow users to make selections from a particular library of media titles. Upon selecting the given media title, the video streaming service streams media content associated with the media title to the endpoint device. The streamed media content normally includes encoded frames of video and/or audio that can be decoded by a media player executing on the endpoint device to provide video and/or audio output to the user.

Before a given media title is available for streaming, the video streaming service usually performs encoding operations on source media content to generate one or more different encoded versions of the source media content. For example, the video streaming service could encode the source media content with a range of different video and/or audio resolutions. Encoding the source media content in this fashion allows the video streaming service to stream different versions of the media title to users based on differing levels of available bandwidth and/or other variable streaming parameters.

The source media content typically includes raw video frames and raw audio samples corresponding to those raw video frames. Different sequences of raw video frames and corresponding raw audio samples are sometimes organized into different "segments." A given segment could be, for example, an introductory portion of a serial media title, a portion of a story arc associated with a branching narrative media title, a specific scene within a given media title, a short segment of padding that is included for various reasons but is not meant to be rendered, or a credit sequence associated with a given media title, among others. Multiple segments are oftentimes stored together in memory in a "back to back" arrangement without any intervening gaps between adjacent raw video frames or between adjacent raw audio samples. Physical boundaries between segments are usually defined based on specific raw video frames that delineate the start and end of any two physically adjacent segments.

When encoding raw video frames, a video encoder sequentially encodes the raw video frames included in a given segment to generate encoded video frames for that segment. The video encoder typically generates a different encoded video frame for each raw video frame in the segment, including the specific raw video frame that delineates the end of the segment. When encoding raw audio samples, an audio encoder sequentially encodes groups of raw audio samples included in the given segment to generate encoded audio frames for that segment. The audio encoder typically generates a different encoded audio frame for each group of raw audio samples in the segment.

When performing the above encoding operations with certain encoder settings, the number of raw audio samples included in a given segment may not be evenly divisible by the number of raw audio samples included in a given group of raw audio samples. In such cases, when the audio encoder reaches the end of the given segment, not enough raw audio samples remain to form a complete group.

Consequently, the audio encoder usually groups the remaining raw audio samples from the end of the given segment with some of the raw audio samples from the beginning of the segment of the source media content that resides physically subsequent to the given segment in memory. The audio frame generated using these different audio samples effectively overlaps the physical boundary between the given segment and the physically-subsequent segment in memory. During playback of the given segment, the overlapping audio frame is decoded in conjunction with playback of the last video frame of the given segment. Similarly, during playback of the physically-subsequent segment, the overlapping audio frame is decoded in conjunction with playback of the first video frame of the physically-subsequent segment. In both cases, the overlapping audio frame is decoded to generate some audio samples associated with the last video frame of the given segment and other audio samples associated with the first video frame of the physically-subsequent segment.

When the given segment and the physically-subsequent segment are played consecutively to one another, the overlapping audio frame is decoded in conjunction with a transition between the last video frame of the given segment and the first video frame of the physically-subsequent segment. In this situation, audio playback occurs "normally" across the transition between segments because the overlapping audio frame is decoded to produce some audio samples associated with the video data present at the end of the given segment and other audio samples associated with video data present at the beginning of the physically-subsequent segment. However, when the given segment and a segment of the source media content that does not reside physically subsequent to the given segment in memory are played consecutively to one another, the overlapping audio frame is decoded in conjunction with a transition between the last video frame of the given segment and the first video frame of the non-physically-subsequent segment. In this situation, audio playback does not occur "normally" across the transition between segments because the overlapping audio frame is decoded to produce some audio samples associated with the video data present at the end of the given segment and other audio samples that are associated with the video data present at the beginning of the physically-subsequent segment instead of with the video data present at the beginning of the non-physically-subsequent segment.

One drawback of the above approach is that users may notice an inconsistency between the video that is being played back and the audio that is being played back. These types of inconsistencies between the video being played back and the audio being played back can be confusing to users and potentially result in a poor user experience. Another drawback is that the correct audio samples that are played back may be acoustically inconsistent with the incorrect audio samples that are to be played subsequent to the correct audio samples. For example, the correct audio samples could have a low amplitude and, therefore, would be played back with a lower volume; whereas, the incorrect audio samples could have a high amplitude and, therefore, would be played with a higher volume. These types of inconsistencies in audio that is played back can be jarring to users and also potentially result in a poor user experience.

As the foregoing illustrates, what is needed in the art are more effective techniques for transitioning across different segments of a media title.

SUMMARY

Various embodiments include computer-implemented method, including identifying a first portion of audio data that should not be played back in conjunction with a first sequence of video segments associated with a media title, identifying a second portion of audio that also should not be played back in conjunction with the first sequence of video segments, determining that the first portion of audio data has a greater playback duration than the second portion of audio data, and preventing the first portion of audio data from being played back in conjunction with the first sequence of video segments.

One advantage of the disclosed techniques is that portions of audio data that are not meant to be played back in conjunction with video frames derived from one or more segments of a media title can be more effectively reduced. Accordingly, situations where incorrect audio is output during playback of a given segment can be largely avoided, thereby enhancing the overall quality of the user experience when streaming media titles.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
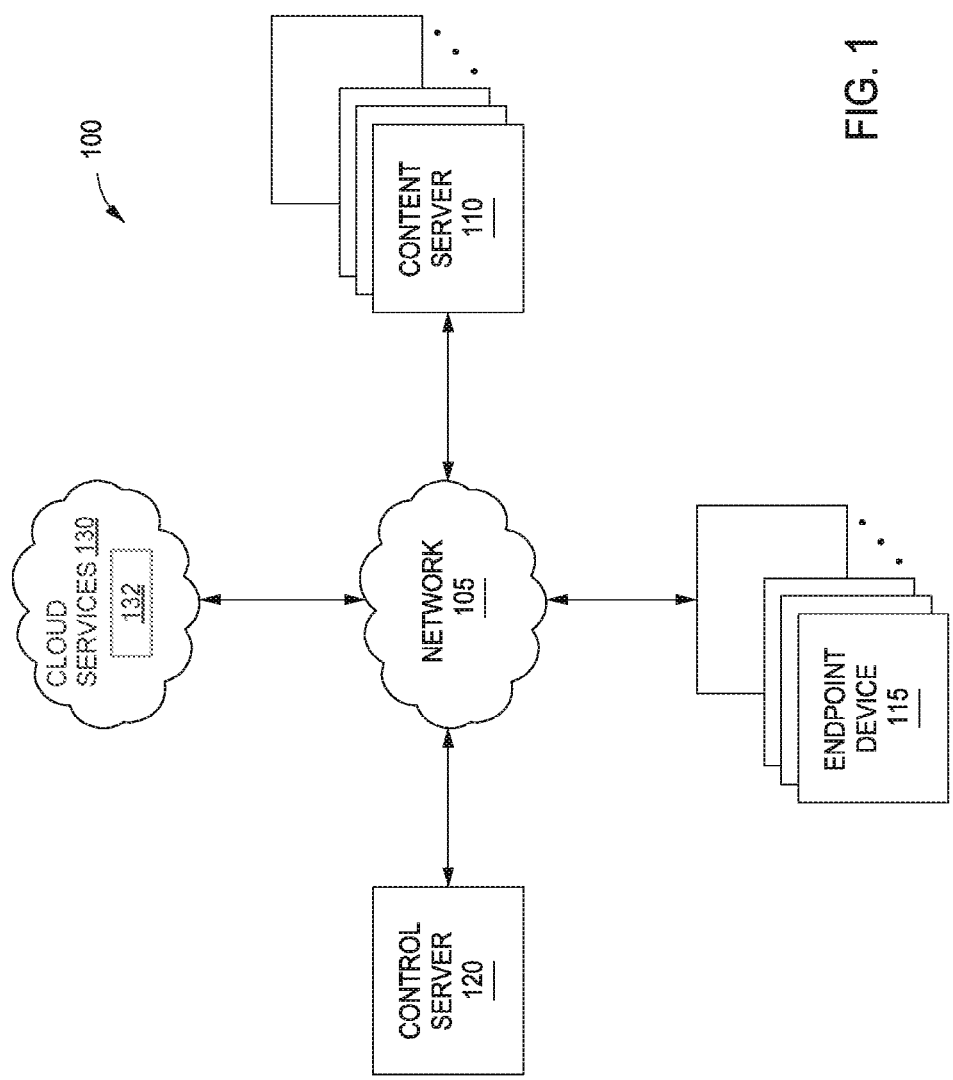
FIG. 1 illustrates a network infrastructure configured to implement one or more aspects of the various embodiments.

In the following description, numerous specific details are set forth to provide a more thorough understanding of the various embodiments. However, it will be apparent to one of skill in the art that the inventive concepts may be practiced without one or more of these specific details.

A video streaming service provides users with access to various types of media titles. A user can stream media content associated with a selected media title to an endpoint device. The media content includes encoded frames of video and/or audio. A media player executing on the endpoint device performs various decoding operations with the media content and then outputs decoded video and/or audio to the user. The quality of the decoded video and/or audio depends, at least to some degree, on the encoding procedure used to generate the encoded frames of video and/or audio included in the media content. Delivering high-quality media content is an important cornerstone in the ongoing effort to maintain and expand the current user base. However, various technical issues associated with conventional encoding procedures impede the delivery of high-quality media content.

In particular, a conventional encoding procedure is applied to source media content to generate encoded frames of video and/or audio that can be streamed to users. The source media content is organized into different viewable "segments" that include sequences of raw video frames and corresponding raw audio samples. During a video encoding portion of the conventional encoding procedure, a video encoder processes the raw video frames to generate video frames encoded with a particular video encoding standard. During an audio encoding portion of the conventional encoding procedure, an audio encoder processes groups of raw audio samples according to a particular audio encoding standard to generate audio frames corresponding to those video frames.

With certain encoder settings, the audio encoder can group together raw audio samples that reside on either side of a boundary between segments and generate an audio frame that overlaps or straddles the boundary between segments. Some of the raw audio samples correspond to the last video frame of a first segment, while other raw audio samples correspond to the first frame of a second segment that resides physically subsequent to the first segment in memory.

When the first segment and the second segment are played successively, the overlapping audio frame is decoded in conjunction with a transition between the last video frame of the first segment and the first video frame of the second segment to produce a first set of audio samples. The first set of audio samples is associated with both the first and second segments.

When the first segment and a third segment are played successively, though, that same overlapping video frame is decoded in conjunction with a transition between the last video frame of the first segment and the first video frame of the third segment to produce the first set of audio samples mentioned above. A subset of those audio samples are associated with the second segment and therefore should not be played in conjunction with the third segment. Audio samples that can be played in conjunction with incorrect video frames are referred to herein as "extraneous audio."

One drawback of the above approach is that extraneous audio is usually inconsistent with the video frames being played. Inconsistencies between audio and video can be noticeable to users and can result in a poor user experience. Another drawback of the above approach is that extraneous audio can be acoustically inconsistent with the audio that should be played in conjunction with the transition between segments. Acoustically inconsistent audio can be jarring to users and can lead to a poor user experience.

To address these issues, various embodiments include a playback application that is configured to analyze the timing of audio frames associated with transitions between segments within a media title to identify one or more portions of extraneous audio. The one or more portions of extraneous audio correspond to one or more audio frames that can potentially be decoded to play incorrect audio samples in conjunction with one or more frames of video. A given audio sample may be considered "incorrect" when the given audio sample is not meant to be played back in conjunction with a particular frame or frames of video and is instead supposed to be played back in conjunction with a different frame or frames of video. In other words, the given audio sample may be considered "incorrect" when the given audio sample is played back at the wrong time. The playback application is configured to analyze the timing of one or more portions of extraneous audio and then determine which of the one or more corresponding audio frames should be dropped. Depending on endpoint device capabilities and/or configurations, the playback application can then perform various techniques to play back the remaining audio portions of different segments in a manner that reduces extraneous audio and/or audio artifacts.

The playback application is further configured to analyze a topology associated with the media title to determine whether any specific portions of extraneous audio are to be played outside of a logical ordering of audio samples set forth in the topology. The topology sets forth a directed graph of possible transitions between segments and constrains playback of those segments to occur along those possible transitions. The playback application determines any portions of extraneous audio that conflict with the topology and then performs various techniques for eliminating these portions of extraneous audio. Those techniques include dropping one or more audio frames, duplicating one or more audio frames across the transition between segments, and/or moving an audio transition.

In addition to the foregoing techniques, various embodiments include a preprocessing engine that modifies the raw audio samples associated with the media title prior to encoding in order to avoid the occurrence of extraneous audio. The preprocessing engine analyzes the topology of the media title in conjunction with analyzing the physical layout of the media title in memory. Based on these analyses, the preprocessing engine identifies pairs of segments of the media title that are logically sequenced according to the topology but not physically sequenced in memory. Extraneous audio can potentially be played during a transition between any given pair of segments that can be identified in this manner. The preprocessing engine analyzes a set of raw audio samples associated with one of the segments associated with a given pair of segments and then replaces a subset of those raw audio samples with another subset of raw audio samples associated with the other segment in the pair. The set of raw audio samples can subsequently be encoded to produce an audio frame that does not decode to produce audio samples that should not be played in conjunction with a transition between the two segments. In this manner, the preprocessing engine can preemptively avoid playback of extraneous audio.

At least one technological advantage of the disclosed techniques relative to the prior art is that portions of audio data that are not meant to be played back in conjunction with video frames derived from one or more segments of a media title can be more effectively reduced. Accordingly, situations where incorrect audio is output during playback of a given segment can be largely avoided, thereby enhancing the overall quality of the user experience when streaming media titles. Another technological advantage of the disclosed techniques relative to the prior art is that portions of audio data that are acoustically divergent from other portions of audio data can be more effectively reduced when analyzed relative to the logical topology of a given media title. Accordingly, situations where jarring and unexpected audio data are inadvertently output to the user can be largely avoided, thereby enhancing the overall streaming experience. Yet another technological advantage of the disclosed techniques relative to the prior art is that extraneous audio data can be preemptively removed from raw audio samples and replaced with non-extraneous audio. Accordingly, the occurrence of incorrect audio during playback of a given media title can be reduced, further improving the overall quality with which media titles can be streamed. These technological advantages represent one or more technological advancements relative to prior art approaches.

System Overview

FIG. 1 illustrates a network infrastructure configured to implement one or more aspects of the various embodiments. As shown, network infrastructure 100 includes content servers 110, control server 120, and endpoint devices 115, each of which are connected via a communications network 105. Network infrastructure 100 is generally used to distribute content to content servers 110 and endpoint devices 115.

Each endpoint device 115 communicates with one or more content servers 110 (also referred to as "caches" or "nodes") via network 105 to download content, such as textual data, graphical data, audio data, video data, and other types of data. The downloadable content, also referred to herein as a "file," is then presented to a user of one or more endpoint devices 115. In various embodiments, endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with control server 120 to determine the location and availability of various files that are tracked and managed by control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from content server 110 or via a broader content distribution network. In some embodiments, content servers 110 enable users to authenticate (e.g., using a username and password) in order to access files stored on content servers 110. Although only a single control server 120 is shown in FIG. 1, in various embodiments multiple control servers 120 may be implemented to track and manage files.

In various embodiments, cloud services 130 may include an online storage service (e.g., Amazon® Simple Storage Service, Google® Cloud Storage, etc.) in which a catalog of files, including thousands or millions of files, is stored and accessed in order to fill content servers 110. Cloud services 130 also may provide compute or other processing services. In one embodiment, cloud services 130 may include a preprocessing engine 132. Preprocessing engine 132 is configured to modify raw audio samples associated with media titles in order to reduce the playback of extraneous audio, as described in greater detail below in conjunction with FIGS. 14A-15. Although only a single cloud services 130 is shown in FIG. 1, in various embodiments multiple cloud services 130 may be implemented.

Figure 2:
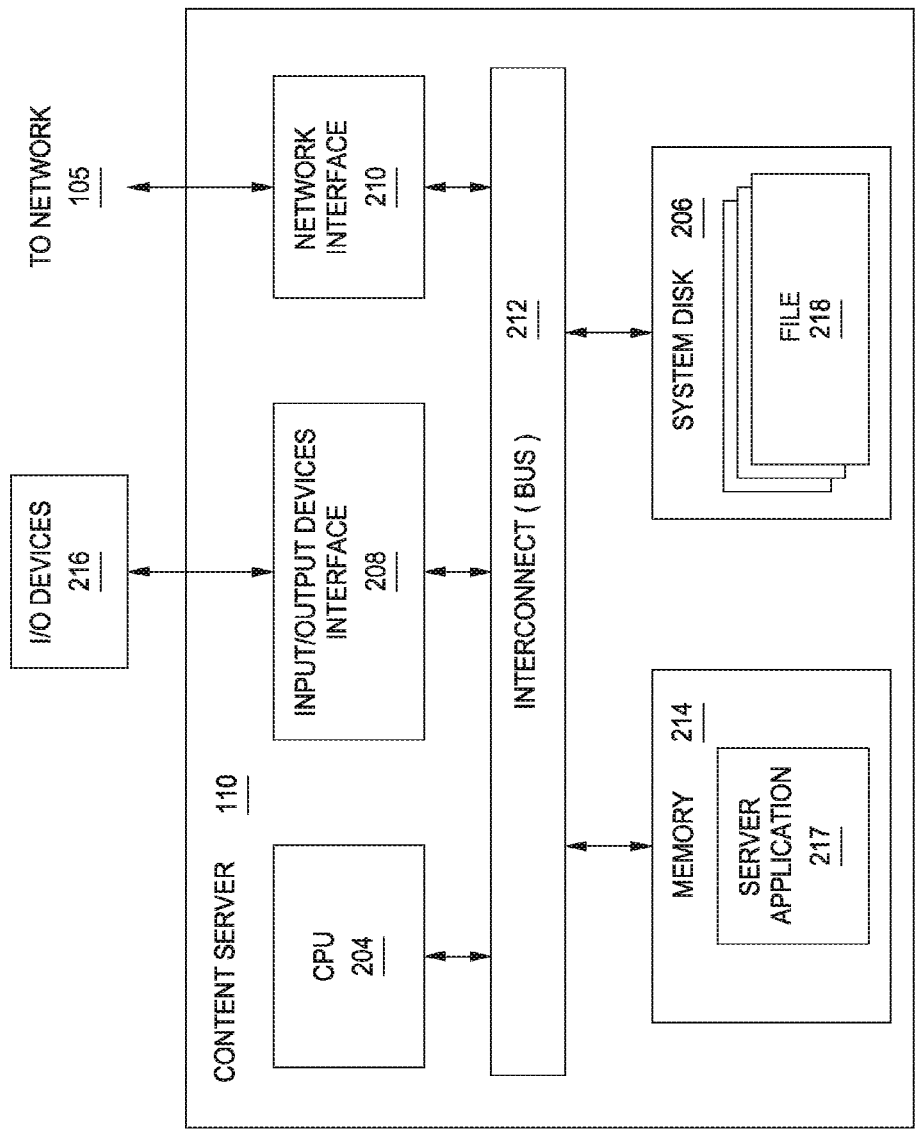
FIG. 2 is a block diagram of a content server that may be implemented in conjunction with the network infrastructure of FIG. 1, according to various embodiments.

FIG. 2 is a block diagram of a content server that may be implemented in conjunction with the network infrastructure of FIG. 1, according to various embodiments. As shown, content server 110 includes, without limitation, a central processing unit (CPU) 204, a system disk 206, an input/output (I/O) devices interface 208, a network interface 210, an interconnect 212, and a system memory 214.

CPU 204 is configured to retrieve and execute programming instructions, such as server application 217, stored in system memory 214. Similarly, CPU 204 is configured to store application data (e.g., software libraries) and retrieve application data from the system memory 214. Interconnect 212 is configured to facilitate transmission of data, such as programming instructions and application data, between CPU 204, system disk 206, I/O devices interface 208, network interface 210, and system memory 214. I/O devices interface 208 is configured to receive input data from I/O devices 216 and transmit the input data to CPU 204 via interconnect 212. For example, I/O devices 216 may include one or more buttons, a keyboard, a mouse, and/or other input devices. I/O devices interface 208 is further configured to receive output data from CPU 204 via interconnect 212 and transmit the output data to I/O devices 216.

System disk 206 may include one or more hard disk drives, solid state storage devices, or similar storage devices. System disk 206 is configured to store non-volatile data such as files 218 (e.g., audio files, video files, subtitles, application files, software libraries, etc.). Files 218 can then be retrieved by one or more endpoint devices 115 via network 105. In some embodiments, network interface 210 is configured to operate in compliance with the Ethernet standard.

System memory 214 includes a server application 217 configured to service requests for files 218 received from endpoint device 115 and other content servers 110. When server application 217 receives a request for a file 218, server application 217 retrieves corresponding file 218 from system disk 206 and transmits the file 218 to an endpoint device 115 or a content server 110 via network 105. Files 218 include a plurality of digital visual content items, such as videos and still images. In addition, files 218 may include metadata associated with such visual content items, user/subscriber data, etc. Files 218 that include visual content item metadata and/or user/subscriber data may be employed to facilitate the overall functionality of network infrastructure 100. In alternative embodiments, some or all of files 218 may instead be stored in a control server 120, or in any other technically feasible location within network infrastructure 100.

Figure 3:
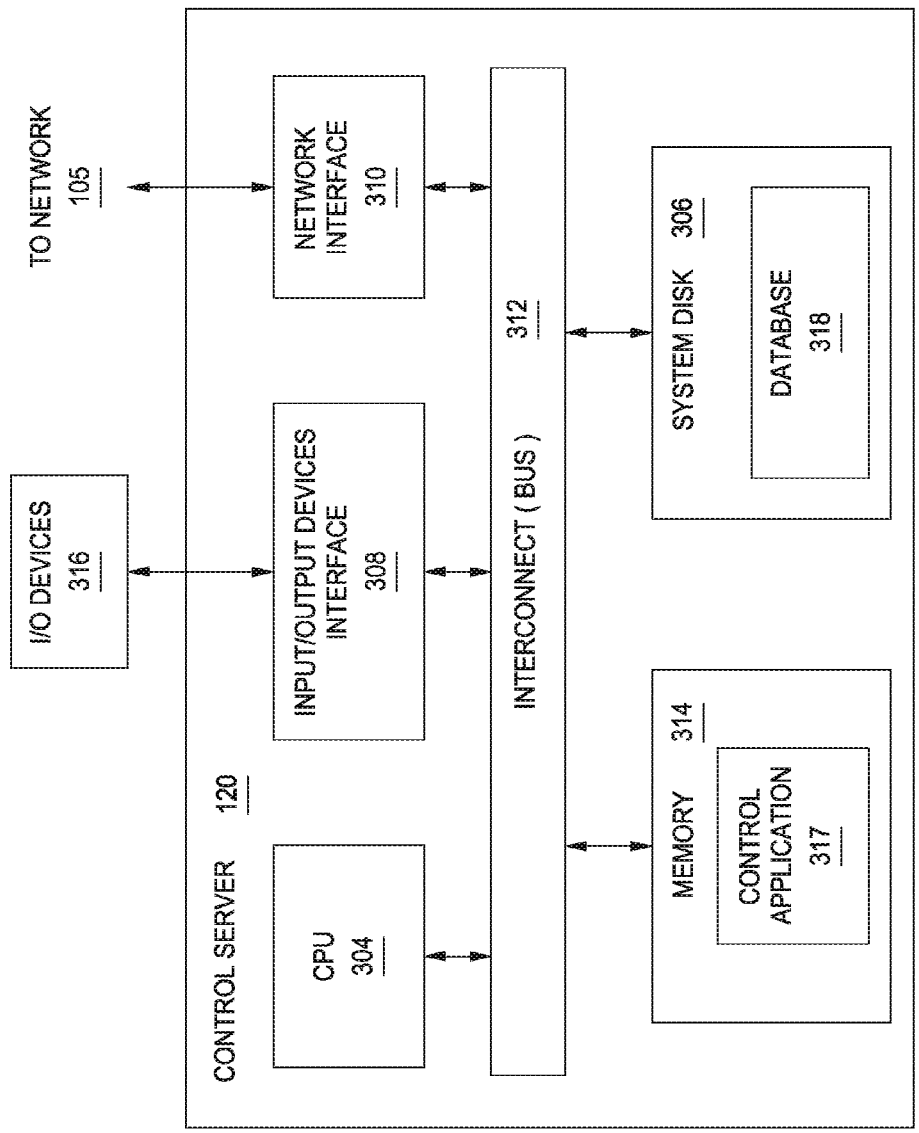
FIG. 3 is a block diagram of a control server that may be implemented in conjunction with the network infrastructure of FIG. 1, according to various embodiments.

FIG. 3 is a block diagram of a control server 120 that may be implemented in conjunction with the network infrastructure 100 of FIG. 1, according to various embodiments. As shown, the control server 120 includes, without limitation, a central processing unit (CPU) 304, a system disk 306, an input/output (I/O) devices interface 308, a network interface 310, an interconnect 312, and a system memory 314.

CPU 304 is configured to retrieve and execute programming instructions, such as control application 317, stored in system memory 314. Similarly, CPU 304 is configured to store application data (e.g., software libraries) and retrieve application data from system memory 314 and a database 318 stored in system disk 306. Interconnect 312 is configured to facilitate transmission of data between CPU 304, system disk 306, I/O devices interface 308, network interface 310, and system memory 314. I/O devices interface 308 is configured to transmit input data and output data between I/O devices 316 and CPU 304 via interconnect 312. System disk 306 may include one or more hard disk drives, solid state storage devices, and the like. System disk 206 is configured to store a database 318 of information associated with content servers 110, cloud services 130, and files 218.

System memory 314 includes a control application 317 configured to access information stored in database 318 and process the information to determine the manner in which specific files 218 will be replicated across content servers 110 included in the network infrastructure 100. Control application 317 may further be configured to receive and analyze performance characteristics associated with one or more of content servers 110 and/or endpoint devices 115. As noted above, in some embodiments, metadata associated with such visual content items, and/or user/subscriber data may be stored in database 318 rather than in files 218 stored in content servers 110.

Figure 4:
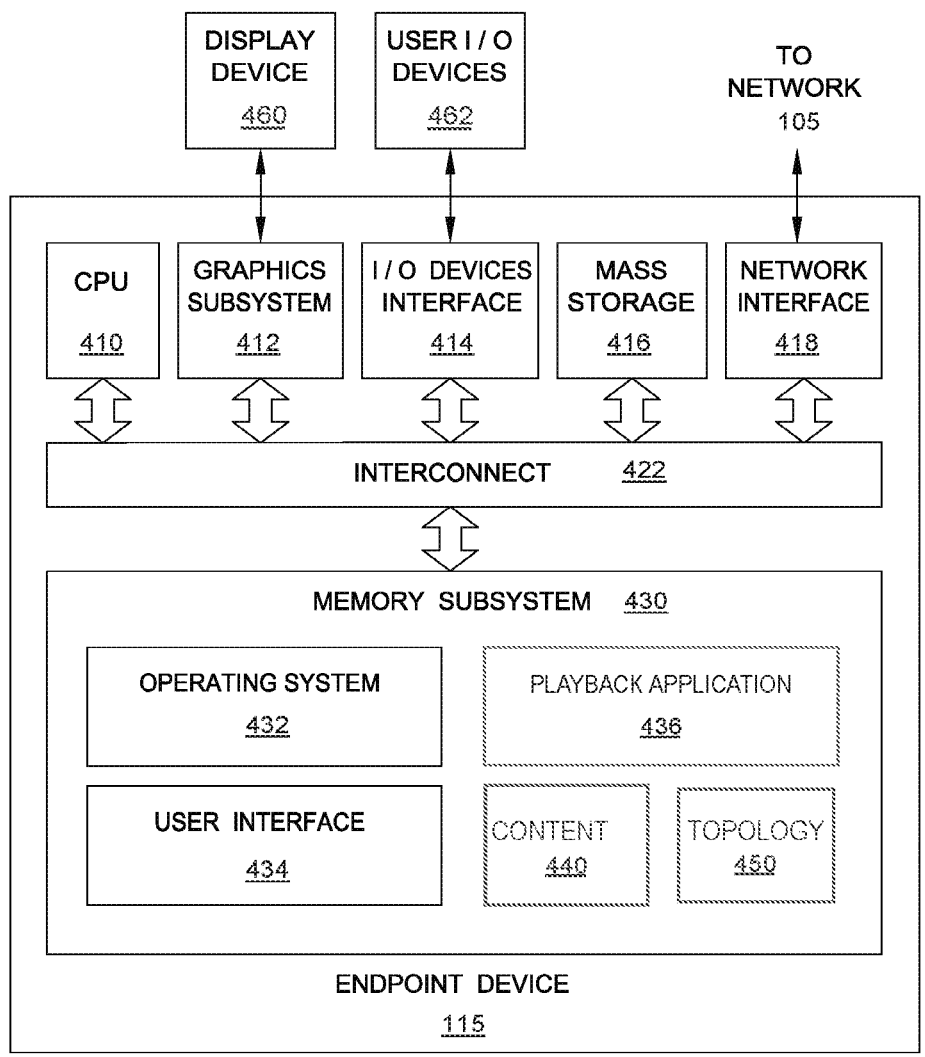
FIG. 4 is a block diagram of an endpoint device that may be implemented in conjunction with the network infrastructure of FIG. 1, according to various embodiments.

FIG. 4 is a block diagram of an endpoint device that may be implemented in conjunction with the network infrastructure of FIG. 1, according to various embodiments. As shown, endpoint device 115 may include, without limitation, a CPU 410, a graphics subsystem 412, an I/O device interface 414, a mass storage unit 416, a network interface 418, an interconnect 422, and a memory subsystem 430.

In some embodiments, CPU 410 is configured to retrieve and execute programming instructions stored in memory subsystem 430. Similarly, CPU 410 is configured to store and retrieve application data (e.g., software libraries) residing in memory subsystem 430. Interconnect 422 is configured to facilitate transmission of data, such as programming instructions and application data, between CPU 410, graphics subsystem 412, I/O devices interface 414, mass storage 416, network interface 418, and memory subsystem 430.

In some embodiments, graphics subsystem 412 is configured to generate frames of video data and transmit the frames of video data to display device 460. In some embodiments, graphics subsystem 412 may be integrated into an integrated circuit, along with CPU 410. Display device 450 may comprise any technically feasible means for generating an image for display. For example, display device 460 may be fabricated using liquid crystal display (LCD) technology, cathode-ray technology, and light-emitting diode (LED) display technology. An input/output (I/O) device interface 414 is configured to receive input data from user I/O devices 462 and transmit the input data to CPU 410 via interconnect 422. For example, user I/O devices 462 may comprise one of more buttons, a keyboard, and a mouse or other pointing device. I/O device interface 414 also includes an audio output unit configured to generate an electrical audio output signal. User I/O devices 462 includes a speaker configured to generate an acoustic output in response to the electrical audio output signal. In alternative embodiments, display device 460 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via network 105. In some embodiments, network interface 418 is configured to communicate using the well-known Ethernet standard. Network interface 418 is coupled to CPU 410 via interconnect 422.

In some embodiments, memory subsystem 430 includes programming instructions and application data that comprise an operating system 432, a user interface 434, and a playback application 436. Operating system 432 performs system management functions such as managing hardware devices including network interface 418, mass storage unit 416, I/O device interface 414, and graphics subsystem 412. Operating system 432 also provides process and memory management models for user interface 434 and playback application 436. User interface 434, such as a window and object metaphor, provides a mechanism for user interaction with endpoint device 108. Persons skilled in the art will recognize the various operating systems and user interfaces that are well-known in the art and suitable for incorporation into endpoint device 108.

In some embodiments, playback application 436 is configured to request and receive content 440 from content server 105 via network interface 418. Content 440 includes encoded frames of video and/or audio data associated with a media title. Those frames of video and/or audio are generally organized into "segments" that can be played back to the user. A given segment could be, for example, an introductory portion of a serial media title, a portion of a story arc associated with a branching narrative media title, a specific scene within a given media title, or a credit sequence associated with a given media title, among others. Playback application 436 is configured to interpret content 440 and present the content via display device 460 and/or user I/O devices 462. In so doing, playback application 436 may generate frames of video data based on content 440 and then transmit those frames of video data to a platform player associated with endpoint device 115. In response, the platform player causes display device 460 to output the frames of video data. In one embodiment, operating system 432 includes one or more platform players.

In one embodiment, playback application 436 is configured to execute instructions for displaying specific segments of content 440 based on topology 450 and based on user input. Topology 450 sets forth a directed graph of possible transitions between segments and constrains playback of those segments to occur based on those possible transitions. During playback, the user can provide input to endpoint device 115 to cause playback to proceed along a desired set of segments, so long as the transitions between those segments are allowed based on topology 450.

For example, content 440 could include a set of narrative components that can be assembled based on user input to generate different story arcs. Each narrative component could include a media segment that relays a portion of a story. During playback, the user can select between an available set of options defined via topology 450 to cause playback to proceed to a desired segment. In response, playback application 436 initiates playback of a subsequent media segment that is associated with the selected option. By selecting different options, the user can experience different story arcs.

In various other embodiments, playback can proceed along a particular path for various reasons other than the receipt of user input. For example, lack of user input could cause a default path to be followed. State established earlier during playback might cause the available paths to be reduced to less than those available in topology 450, including reduction to a single path, where the existence of a branch point would be hidden from the user. In other use-cases outside of a branching narrative, different paths may correspond to different localized versions of content 440 and so the paths for a given user may be pre-determined based on language settings.

In various embodiments, playback application 436 analyzes content 440 and topology 450 during playback in order to effect smooth transitions between segments. In so doing, playback application 436 performs various techniques to reduce the playback of extraneous audio that can be introduced via conventional encoding procedures, as discussed above. These techniques are described in greater detail below in conjunction with FIGS. 5A-13.

Encoding Audio Frames that Overlap Segment Boundaries

Figure 5A:
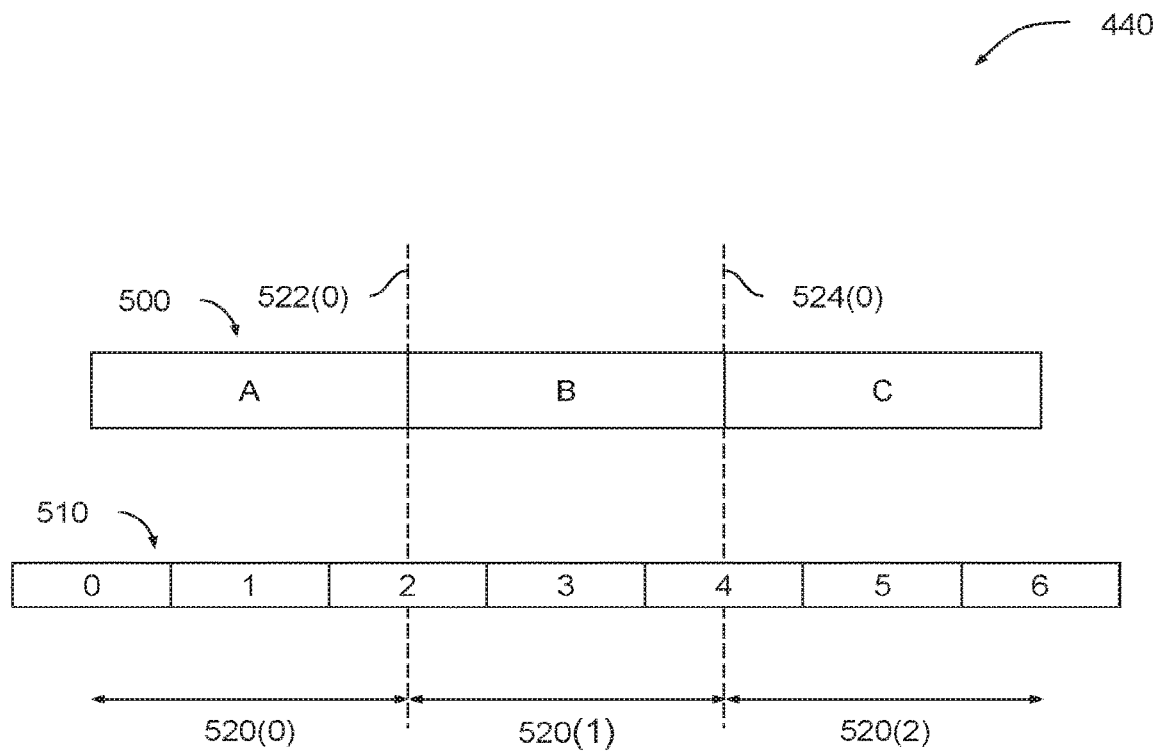
FIG. 5A illustrates how the content of FIG. 4 is organized in memory, according to various embodiments.

FIG. 5A illustrates how the content of FIG. 4 is organized in memory, according to various embodiments. As referred to herein, the term "in memory" generally refers to the physical arrangement of data associated with media segments that potentially reside, at least in part, in a variety of different physical locations, including one or more files within client memory, server memory, or elsewhere. As shown, content 440 includes video segments 500 and audio frames 510 organized into segments 520. Video segments 500 include video segments A, B, and C. Audio frames 510 include audio frames 0, 1, 2, 3, 4, 5, and 6. Video segment A corresponds to audio frames 0, 1, and 2. Video segment B corresponds to audio frames 2, 3, and 4. Video segment C corresponds to audio frames 4, 5, and 6. Each video segment 500 includes one or more video frames encoded with a particular video encoding standard. Each audio frame 510 includes (or is derived from) one or more encoded audio samples encoded with a particular audio encoding standard. Persons skilled in the art will recognize that the number and lengths video segments and audio frames shown in FIG. 5A, among other places, are provided for illustrative purposes and are not drawn to scale.

As discussed above, a given segment can include video content as well as corresponding audio content. One or more boundaries of a given segment are defined based on the video portion of the segment. For example, a segment boundary 522(0) between segments 520(0) and 520(1) could be defined based on the last video frame of video segment A and/or the first video frame of video segment B. Similarly, a segment boundary 522(1) between segments 520(1) and 520(2) could be defined based on the last video frame of video segment B and/or the first video frame of video segment C.

Content 440 is generated during an encoding procedure that includes a video encoding portion and an audio encoding portion. During the video encoding portion of the encoding procedure, a video encoder processes raw video frames to generate the video frames within video segments 500. During an audio encoding portion of the encoding procedure, an audio encoder processes raw audio samples to generate audio frames 510 associated with those video segments 500.

In various configurations, the video encoder and the audio encoder generate video frames and audio frames that have different durations and therefore have frame boundaries that sometimes do not align with one another. For example, when encoding a set of M raw audio samples associated with a given segment 520, the audio encoder could be configured to group together N raw audio samples to generate each audio frame, where M and N are non-negative integers. However, if N is not a multiple of M, then the audio encoder groups together some raw audio samples from the end of that segment and some raw audio samples from the beginning of a physically-subsequent segment in memory. As a result, certain audio frames overlap segment boundaries. For example, audio frame 2 overlaps segment boundary 522(0) and audio frame 4 overlaps segment boundary 522(1).

When playback proceeds across segments in accordance with the physical layout of those segments in memory, audio frames that overlap segment boundaries are decoded and played in conjunction with transitions between those segments. Playback does not always proceed across segments in accordance with the physical layout of those segments in memory, though. In some cases, playback proceeds based on topology 450, as described in greater detail below in conjunction with FIG. 5B.

Figure 5B:
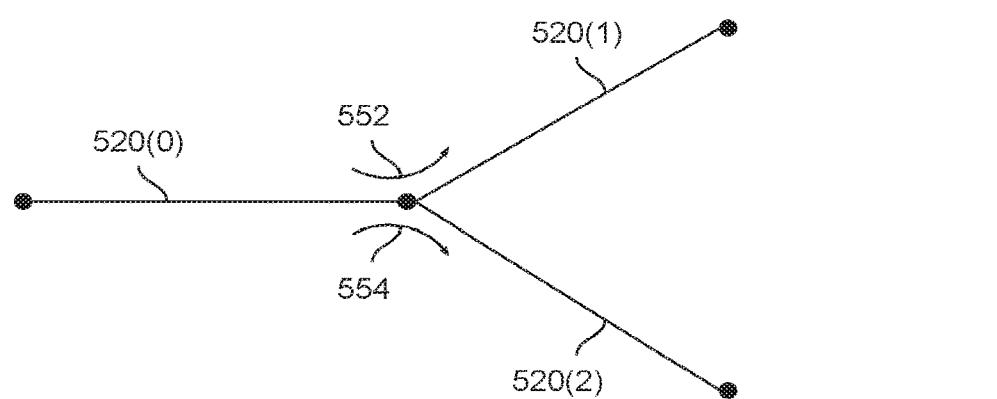
FIG. 5B illustrates how the topology of FIG. 4 defines different logical sequences of segments, according to various embodiments.

FIG. 5B illustrates how the topology of FIG. 4 defines different logical sequences of segments, according to various embodiments. As shown, topology 450 defines two different logical sequences that constrain the playback of content 440. Logical sequence 552 allows segment 520(0) (including video segment A and corresponding audio) to be played back followed by segment 520(1) (including video segment B and corresponding audio). Logical sequence 554 allows segment 520(0) (including video segment A and corresponding audio) to be played back followed by segment 520(2) (including video segment C and corresponding audio). Playback can proceed according to either logical sequence based on user input, among other factors.

Segment 520(0) immediately precedes segment 520(1) in topology 440, as is shown, and segment 520(0) also immediately precedes segment 520(1) in memory, as shown in FIG. 5A. Accordingly, the logical sequence of segments 520(0) and 520(1) in topology 440 may be considered consistent with the physical sequence of segments 520(0) and 520(1) in memory. Segment 520(0) also immediately precedes segment 520(2) in topology 440, as is shown, but segment 520(0) does not immediately precede segment 520(2) in memory, as shown in FIG. 5A. Accordingly, the logical sequence of segments 520(0) and 520(2) in topology 440 may be considered inconsistent with the physical sequence of segments 520(0) and 520(2) in memory. Playback across logical sequences 552 and 554 differs based on whether the logical sequence of the associated segments is consistent with the physical sequence of those segments, as described in greater detail below in conjunction with FIGS. 6A-6B.

Identifying Extraneous Audio Data Associated with Segment Boundaries

Figure 6A:
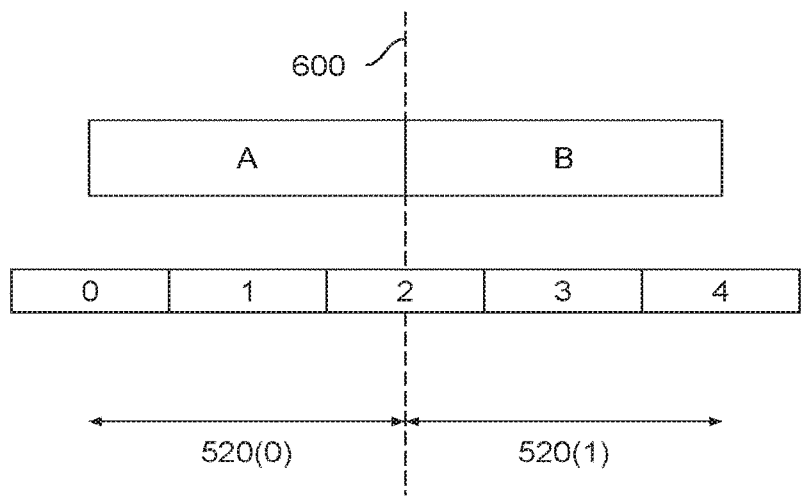
FIG. 6A illustrates a logical sequence of segments that is consistent with a physical sequence of those segments in memory, according to various embodiments.

FIG. 6A illustrates a logical sequence of segments that is consistent with a physical sequence of those segments in memory, according to various embodiments. As shown, playback pathway 552 includes a transition 600 between segments 520(0) and 520(1). During playback, playback application 436 plays video segment A in conjunction with audio frames 0, 1, and 2 followed by video segment B in conjunction with audio frames 2, 3, and 4. Although audio frame 2 overlaps the physical boundary between segments 520(0) and 520(1), audio frame 2 needs to be played in conjunction with both the last video frame of A and the first video frame of B and so audio playback can proceed seamlessly across transition 600 between segments 520(0) and 520(1). Audio playback does not proceed in this manner when the logical sequence of segments is inconsistent with the physical sequence of those segments in memory, though.

Figure 6B:
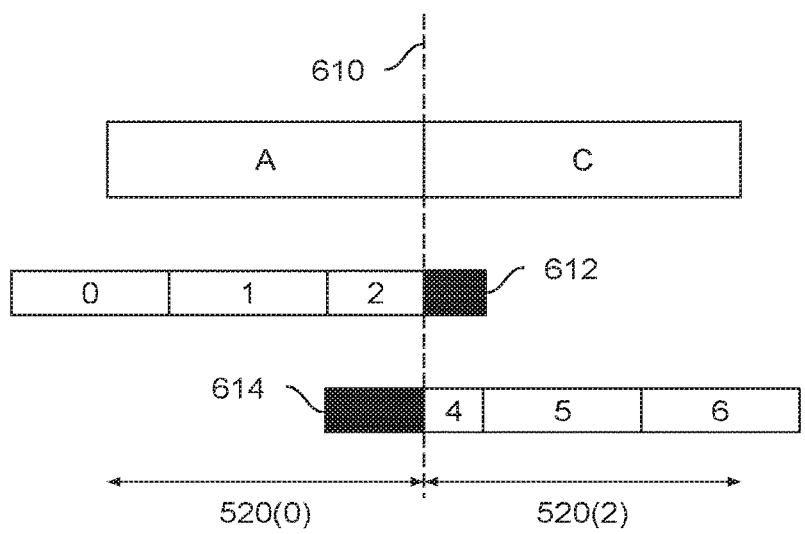
FIG. 6B illustrates a logical sequence of segments that is inconsistent with a physical sequence of those segments in memory, according to various embodiments.

FIG. 6B illustrates a logical sequence of segments that is inconsistent with a physical sequence of those segments in memory, according to various embodiments. As shown, playback pathway 554 includes a transition 610 between segments 520(0) and 520(2). Transition 610 may correspond to a "splice point" where segments 520(0) and 520(2) are spliced together. During playback, playback application 436 plays video segment A in conjunction with audio frames 0, 1, and 2 followed by video segment C in conjunction with audio frames 4, 5, and 6. Playback application 436 decodes frame 2 in conjunction with the last video frame of video segment A and decodes frame 4 in conjunction with the first video frame of video segment C.

However, a portion of audio frame 2 is derived from segment 520(1) because audio frame 2 overlaps the physical boundary between segments 520(0) and 520(1) and segment 520(1) immediately follows segment 520(0) in memory. This portion of audio frame 2 is referred to as "extraneous audio" and is shown in FIG. 6B as extraneous audio 612. The duration of extraneous audio 612 can vary based on how much of audio frame 2 overlaps the physical boundary between segments 520(0) and 520(1). Similarly, a portion of audio frame 4 is derived from segment 520(1) because audio frame 4 overlaps the physical boundary between segments 520(1) and 520(2) and segment 520(1) immediately precedes segment 520(2) in memory. This portion of audio frame 4 is shown in FIG. 6B as extraneous audio 614. The duration of extraneous audio 614 can vary based on how much of audio frame 4 overlaps the physical boundary between segments 520(1) and 520(2).

Extraneous audio 612 and extraneous audio 614 can cause various issues during playback that can degrade the overall viewing experience. In particular, playing video with incorrect audio can be confusing to the user. Additionally, that audio could have acoustic properties that are incompatible with other audio samples. For example, the audio samples associated with segments 520(0) and 520(2) could have a relatively low amplitude, but extraneous audio 612 and/or 614 could have a relatively high amplitude. In this scenario, playback application 436 might abruptly play high-volume sounds, which may sound off to some users. Playback application 436 can implement several different techniques to analyze and remove extraneous audio, as described in greater detail below in conjunction with FIGS. 7A-7C.

Selectively Dropping Audio Frames to Remove Extraneous Audio

Figure 7A:
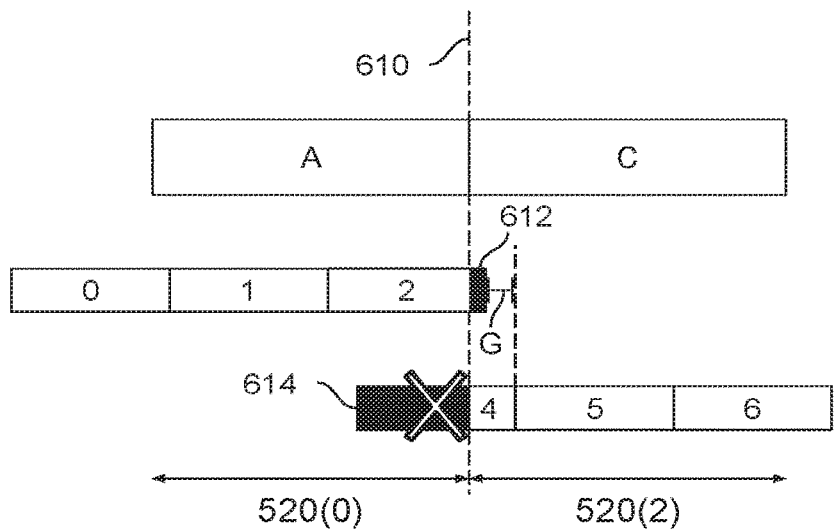
FIG. 7A illustrates how the playback application of FIG. 4 selectively drops audio frames to reduce the playback of extraneous audio data, according to various embodiments.

FIG. 7A illustrates how the playback application of FIG. 4 selectively drops audio frames to reduce the playback of extraneous audio data, according to various embodiments. As mentioned above, the duration of extraneous audio 612 and extraneous audio 614 can vary based on how much of audio frames 2 and 4 overlap the associated physical boundaries between segments. Playback application 436 can analyze the durations of extraneous audio 612 and extraneous audio 614 and then selectively drop either audio frame 2 or audio frame 4 depending on which duration is greater. In the example shown, the duration of extraneous audio 614 exceeds that of extraneous audio 612 and so playback application 436 drops audio frame 4. In doing so, playback application 436 introduces a small gap G between the end of audio frame 2 and the beginning of audio frame 5.

The technique described in conjunction with FIG. 7A differs from previous approaches to mitigating extraneous audio because with previous approaches, audio frames that include extraneous audio cannot be selectively dropped based on the duration of the extraneous audio. Importantly, because playback application 436 can account for the duration of extraneous audio when selectively dropping audio frames, the amount of extraneous audio that is played back to the user can be minimized. Playback application 436 can perform additional techniques depending on endpoint device capabilities, as described in greater detail below in conjunction with FIG. 7B.

Figure 7B:
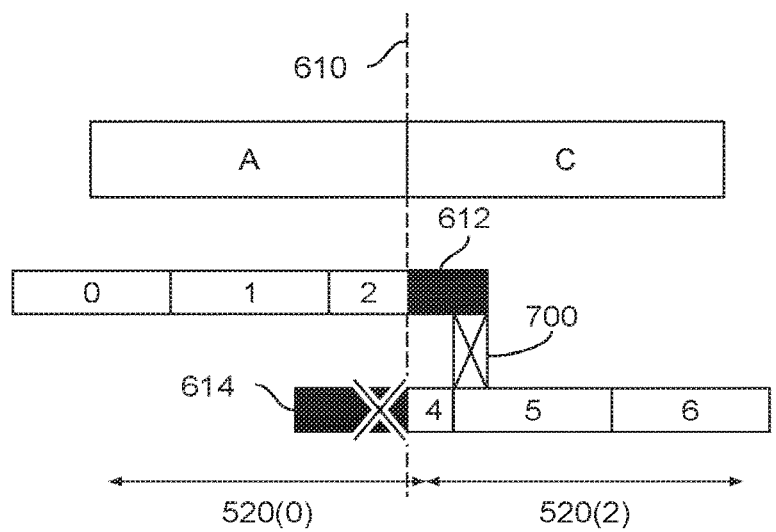
FIG. 7B illustrates how the playback application of FIG. 4 drops and crossfades audio frames to minimize the playback of extraneous audio data, according to various embodiments.

FIG. 7B illustrates how the playback application of FIG. 4 drops and crossfades audio frames to minimize the playback of extraneous audio data, according to various embodiments. Some implementations of playback application 436 support crossfading between audio frames and/or other techniques for mitigating discontinuities. For example, browser-based implementations of playback application 436 that execute within the context of a web page would typically be able to perform crossfade operations. In the example shown, playback application 436 implements crossfading techniques in conjunction with the selective frame dropping discussed above in conjunction with FIG. 7A. In particular, playback application 436 selectively drops frame 4 because the duration of extraneous audio 614 exceeds that of extraneous audio 612 and then playback application 436 performs crossfade 700 between a portion of extraneous audio 612 and a portion of frame 5. In some instances, portion of extraneous audio 612 may have varying durations in order to adhere to one or more content delivery standards, such as the Hyper Text Markup Language 5 (HTML5) standard.

The technique described in conjunction with FIG. 7B differs from previous approaches to mitigating extraneous audio for at least the reasons discussed above in conjunction with FIG. 7A. Additionally, because the duration of extraneous audio that is ultimately played back can be minimized, the amount of crossfading needed can also be minimized, which reduces the amount of correct audio that is mixed together with extraneous audio. Playback application 436 can perform another technique that does not involve introducing gaps or performing crossfades, as described in greater detail below in conjunction with FIG. 7C.

Figure 7C:
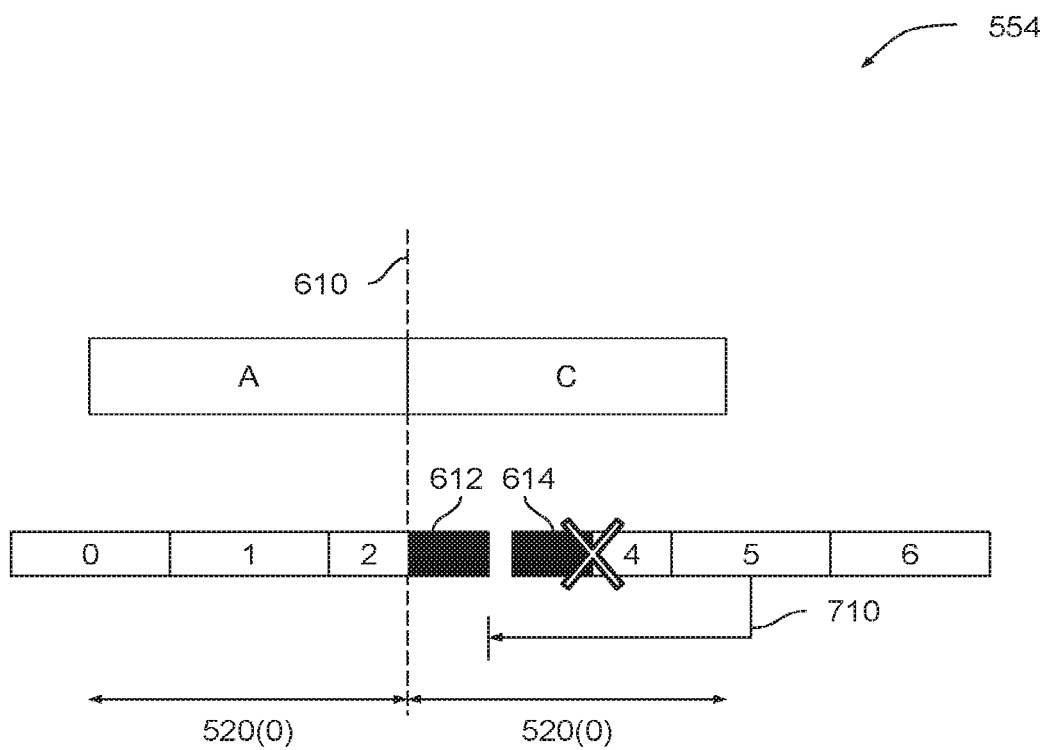
FIG. 7C illustrates how the playback application of FIG. 4 drops and shifts audio frames to minimize the playback of extraneous audio data, according to various embodiments.

FIG. 7C illustrates how the playback application of FIG. 4 drops and shifts audio frames to minimize the playback of extraneous audio data, according to various embodiments. Some implementations of playback application 436 support seamless audio transitions by shifting audio frames in time relative to corresponding video frames. This approach may be known in the art as "frame seamless." In the example shown, playback application 436 implements frame seamless techniques in conjunction with the selective frame dropping discussed above in conjunction with FIG. 7A.

In particular, playback application 436 determines that the duration of extraneous audio 614 exceeds that of extraneous audio 612 and, in response, drops frame 4. Playback application 436 then performs shift 710 with frames 5 and 6 to allow a seamless audio transition from audio frame 2 to audio frame 5. In performing this technique, playback application 436 generally maintains an audio/visual (AV) synchronization (sync) error that reflects a time offset between video playback and audio playback. Playback application 436 can drop additional frames that include extraneous audio, such as frame 2, if the maximum AV sync error would not be exceeded. In various embodiments, playback application 436 may maintain a maximum AV sync error that is equal to the duration of one audio frame or one video frame. In other embodiments, playback application 436 maintains a maximum AV sync error that is equal to any fractional amount of the duration of one audio frame or one video frame.

As a general matter, in various embodiments, there may be both a minimum and a maximum bound on AV sync error, where the AV sync error is defined to be how far the audio is behind the video (where negative numbers imply that the audio is ahead of the video). In some cases, the maximum AV sync error can be one audio frame. In other cases, the maximum AV sync error can be any fractional amount of the duration of an audio frame. The minimum AV sync error may be equal to the maximum AV sync error minus one audio frame, however it could be set less than this and that could offer more opportunities to drop extraneous audio.

The technique described in conjunction with FIG. 7C differs from previous approaches to mitigating extraneous audio for at least the reasons discussed above in conjunction with FIG. 7A. Additionally, the disclosed technique allows audio frames to be played back seamlessly across transitions between segments, thereby avoiding gaps and crossfades.

Referring generally to FIGS. 7A-7C, playback application 436 can implement the above techniques depending on endpoint device capabilities and/or configuration. The above techniques are described in greater detail below in conjunction with FIG. 8.

Figure 8:
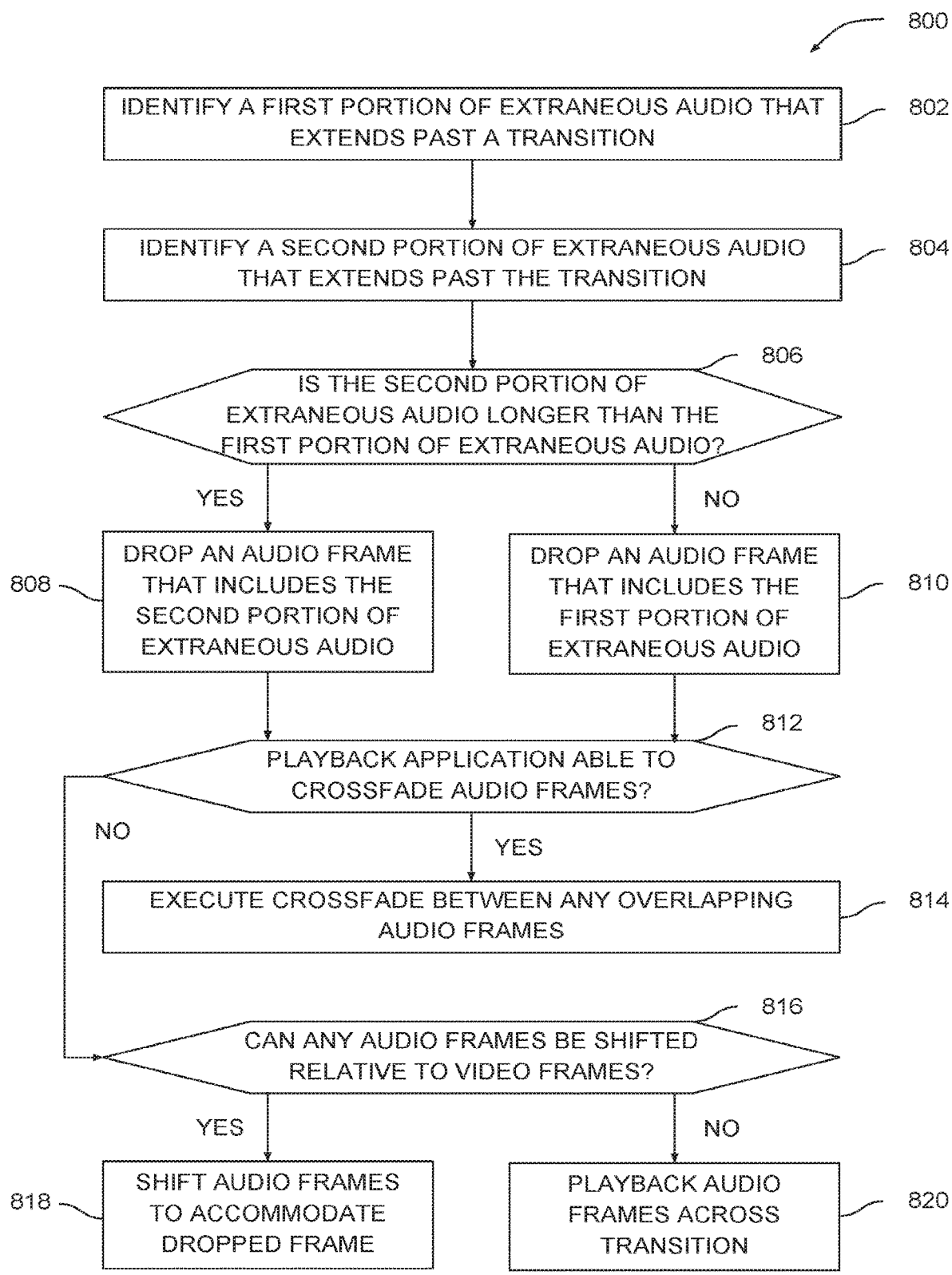
FIG. 8 is a flow diagram of method steps for reducing the playback of extraneous audio data, according to various embodiments.

FIG. 8 is a flow diagram of method steps for reducing the playback of extraneous audio data, according to various embodiments. Although the method steps are described in conjunction with the systems of FIGS. 1-7C, persons skilled in the art will understand that any system configured to perform the method steps, in any order, is within the scope of the present embodiments.

As described below, playback application 436 performs various techniques to selectively drop audio frames (potentially introducing a gap), as discussed in conjunction with steps 806, 808, and 810 of the method 800, crossfade audio frames, as discussed in conjunction with steps 812 and 814 of the method 800, and shift audio frames, as discussed in conjunction with steps 816, 818, and 820 of the method 800. In some configurations, playback application 436 may be pre-configured to implement just one of these techniques without performing the other two techniques. For example, playback application 436 could be configured to only perform steps 816, 818, and 820 to shift audio frames without performing steps 806, 808, 810, 812, and 814 to drop and/or crossfade audio frames. The various techniques are presented here in conjunction with the method 800 to explain the range of techniques that playback application 436 can be configured to implement. Any given technique, when implemented, may affect, or be affected by, other logic that playback application 436 implements to drop one or more audio frames.

In one embodiment, playback application 436 may implement a conventional technique to first determine the number of audio frames to drop, either to leave a gap, an overlap for crossfading, or to modify the AV sync error via frame shifting, and then subsequently perform a novel technique whereby the choice of which frames to drop is informed by the logical topology of the media content and/or the duration of extraneous audio. As shown, a method 800 begins at step 802, where playback application 436 identifies a first portion of extraneous audio that extends past a transition between segments. Extraneous audio generally arises during playback of two segments when the logical sequencing of those segments in the relevant topology is not consistent with the physical sequencing of those segments in memory. Playback application 436 identifies the first portion of extraneous audio by determining that the last audio frame of a first one of the two segments overlaps a physical boundary with a different segment.

At step 804, playback application 436 identifies a second portion of extraneous audio that extends past the transition between segments. Extraneous audio can extend past a given transition by extending after the transition, as with extraneous audio 612, or extending before the transition, as with extraneous audio 614. Playback application 436 identifies the second portion of extraneous audio by determining that the first audio frame of a second one of the two segments overlaps a physical boundary with a different segment.

At step 806, playback application 436 determines whether the second portion of extraneous audio has a greater duration than the first portion of extraneous audio. If at step 806 playback application 436 determines that the duration of the first portion of extraneous audio exceeds the duration of the second portion of extraneous audio, then the method 800 proceeds to step 808.

At step 808, playback application 436 drops the audio frame that includes the second portion of extraneous audio. This approach differs from previous approaches that apply fixed rules to dropping audio frames that do not depend on the duration of the portions of extraneous audio. For example, a conventional approach could always drop the first portion of extraneous audio independently of the length of the two portions of extraneous audio. In some cases, dropping the audio frame that includes the second portion of extraneous audio introduces a small gap, as discussed above in conjunction with FIG. 7A. The method 800 then proceeds to step 812.

If at step 806 playback application 436 determines that the first portion of extraneous audio exceeds the duration of the second portion of extraneous audio, then the method 800 proceeds to step 810. At step 810, playback application 436 drops the audio frame that includes the first portion of extraneous audio. In some cases, dropping the audio frame that includes the first portion of extraneous audio introduces a small gap, as discussed above in conjunction with FIG. 7A. In this manner, playback application 436 can selectively drop audio frames that include extraneous audio depending on the duration of that extraneous audio. The method 800 then proceeds to step 812.

At step 812, playback application 436 determines whether crossfade operations are available. Playback application 436 can perform crossfade operations and/or other operations for mitigating discontinuities depending on the capabilities of endpoint device 115 and/or the specific implementation of playback application 436. For example, if endpoint device 115 is a computing device that executes playback application 436 within a web browser, then playback application 436 could be capable of performing crossfade operations. If at step 812 playback application 436 determines that audio frames can be crossfaded, then the method proceeds to step 814. In one embodiment, playback application 436 may implement a conventional rule-based approach to drop both portions of extraneous audio, subsequently allowing one or more audio frames to be shifted, as described below.

At step 814, playback application 436 crossfades any overlapping audio frames that remain after dropping an audio frame in conjunction with either step 808 or 810. In doing so, playback application 436 decodes the overlapping audio samples to generate two sets of audio samples. The audio samples could be, for example, pulse-code modulation (PCM) samples. Playback application 436 then computes a weighted sum of the first and second sets of audio samples, where the weighting applied to corresponding pairs of samples changes across the duration of the crossfade. An example of how playback application 436 could perform step 814 is described above in conjunction with FIG. 7B.

If at step 812 playback application 436 determines that audio frames cannot be crossfaded, then the method proceeds to step 816. At step 816, playback application 436 determines whether any audio frames can be shifted relative to corresponding video frames. Playback application 436 could, for example, analyze the current AV sync error and determine that the current AV sync error is sufficiently below a maximum AV sync error that frame-shifting can be performed.

If at step 816 playback application 436 determines that audio frames can be shifted relative to video frames, then the method 800 proceeds to step 818. At step 818, playback application 436 shifts one or more audio frames associated with a second segment to play immediately after the final audio frame of a first segment, thereby implementing a seamless audio transition. An example of how playback application 436 could perform step 816 is described above in conjunction with FIG. 7C.

If at step 816 playback application 436 determines that audio frames cannot be shifted relative to video frames, then the method 800 proceeds to step 820. At step 820, playback application 436 plays back the remaining audio frames across the transition point between segments. As mentioned above, dropping an audio frame in conjunction with either of steps 808 and 810 can introduce a small gap. Accordingly, in performing step 820, playback application 436 can sometimes play audio across the transition with a small gap.

In performing the method 800, playback application 436 can reduce the amount of extraneous audio that is output during playback of content 440 based on an analysis of the extraneous audio. In addition, playback application 436 can analyze the extraneous audio in conjunction with topology 440 in order to perform other techniques for mitigating playback of extraneous audio, as described in greater detail below in conjunction with FIGS. 9-12B.

Topology-Driven Reduction of Extraneous Audio

Figure 9:
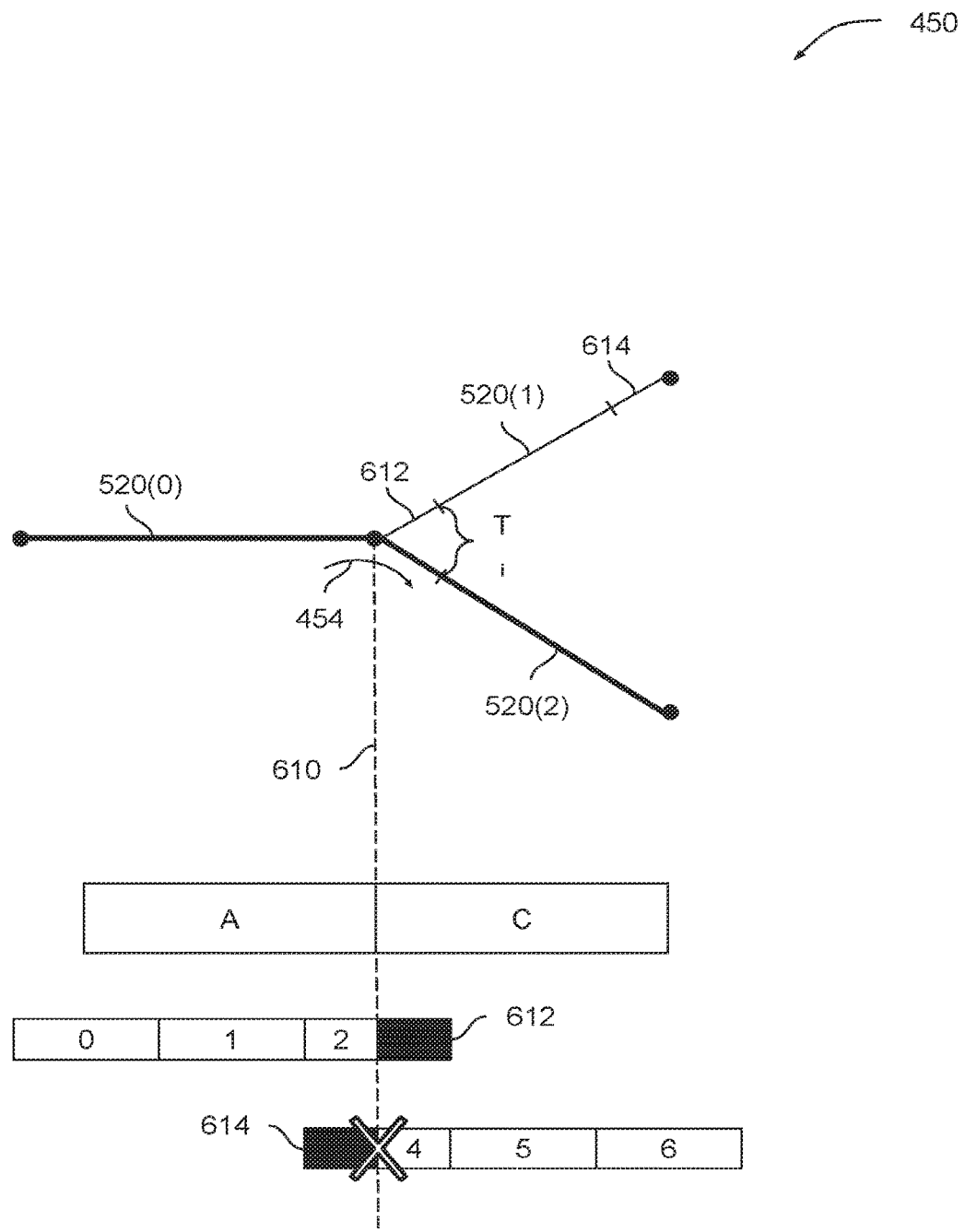
FIG. 9 illustrates how the playback application of FIG. 4 reduces extraneous audio data based on a media title topology, according to various embodiments.

FIG. 9 illustrates how the playback application of FIG. 4 reduces extraneous audio data based on a media title topology, according to various embodiments. As shown, during playback of logical sequence 454 of topology 450, audio frames 2 and 4 are decoded in conjunction with transition 610 to produce extraneous audio 612 and 614, as previously discussed. Extraneous audio 612 corresponds to a beginning portion of segment 520(1), as depicted with regard to topology 450, while extraneous audio 614 corresponds to an ending portion of segment 520(2), as also depicted with regard to topology 450. Segment 520(1) generally resides physically before segment 520(2).

During playback of logical sequence 454, playback application 436 can analyze topology 450 and determine whether the audio samples associated with extraneous audio 612 and/or extraneous audio 614 have similar audio waveforms compared to the audio samples that are supposed to be played in conjunction with video segments A and/or C. If the audio waveform associated with a given portion of extraneous audio is significantly different from the audio samples corresponding to video segments A and C, then playback application 436 can drop the audio frame that includes that portion of EA. If the audio waveform associated with the given portion of extraneous audio is not significantly different from the audio samples corresponding to video segments A and C, then playback application 436 need not drop the corresponding audio frame because playback of the portion of extraneous audio may not be noticeable to users. With this approach, playback application 436 can selectively identify extraneous audio that diverges acoustically from other audio that is to be played in conjunction with a transition between segments.

Playback application 436 can determine whether any two sets of samples correspond to similar or different audio waveforms using a variety of techniques. In one embodiment, segments 520 that share a logical predecessor in topology 450 are subject to an authoring constraint that audio samples within corresponding regions of those segments have similar audio waveforms. For example, segments 520(1) and 520(2) share segment 520(0) as a logical predecessor and could be subject to an authoring constraint that audio samples within an interval $T_i$ have similar audio waveforms. Playback application 436 may determine that two sets of samples do not have significantly different audio waveforms upon determining that those two sets of samples reside in corresponding regions of two respective segments that share a logical predecessor. In another embodiment, playback application 436 may determine that two sets of samples have similar audio waveforms by directly comparing the two sets of samples to one another.

In the example shown, playback application 436 analyzes topology 450 and determines that the audio samples included in initial interval Ti of both segments 520(1) and 520(2) have similar audio waveforms. Based on this determination, playback application 436 determines that extraneous audio 612 includes audio samples that do not diverge acoustically from the audio samples that are supposed to be played in conjunction with video segment C. Playback application 436 can then refrain from dropping extraneous audio 612 because playback of extraneous audio 612 may not be noticeable to users.

Conversely, playback application 436 can analyze topology 450 and determine that extraneous audio 614, which corresponds to the end portion of segment 530(1), likely includes audio samples that diverge acoustically from the audio samples that are meant to be played in conjunction with video segment C. Among other things, the audio samples associated with extraneous audio 614 do not immediately follow the audio samples associated with audio frame 2 and do not immediately precede the audio samples associated with audio frame 4 (from a logical perspective). Accordingly, the presence of these samples conflicts with the logical sequence of segments set forth in topology 450. Based on this determination, playback application 436 can drop audio frame 4.

With the above approach, playback application 436 can identify and reduce extraneous audio that could be noticeable users and keep extraneous audio that may not be noticeable to users. This approach can be combined with any of the other techniques described thus far. For example, if both portions of extraneous audio include audio samples with acoustic incompatibilities, then playback application 436 can reduce the longer of the two portions, as discussed above in conjunction with FIG. 7A. Playback application 436 can then crossfade the remaining audio samples, if available, as discussed above in conjunction with FIG. 7B. Playback application 436 can alternatively shift the remaining audio samples to facilitate a seamless audio transition, as discussed above in conjunction with FIG. 7C.

In certain situations, playback application 436 determines that one or more frames should be dropped to reduce portions of extraneous audio but also determines that those frames cannot be dropped without causing the AV sync error to exceed a maximum AV sync error. In such situations, playback application 436 can implement one or more the techniques described below in conjunction with FIGS. 10A-10B.

Mitigating Extraneous Audio without Exceeding AV Sync Error

Figure 10A:
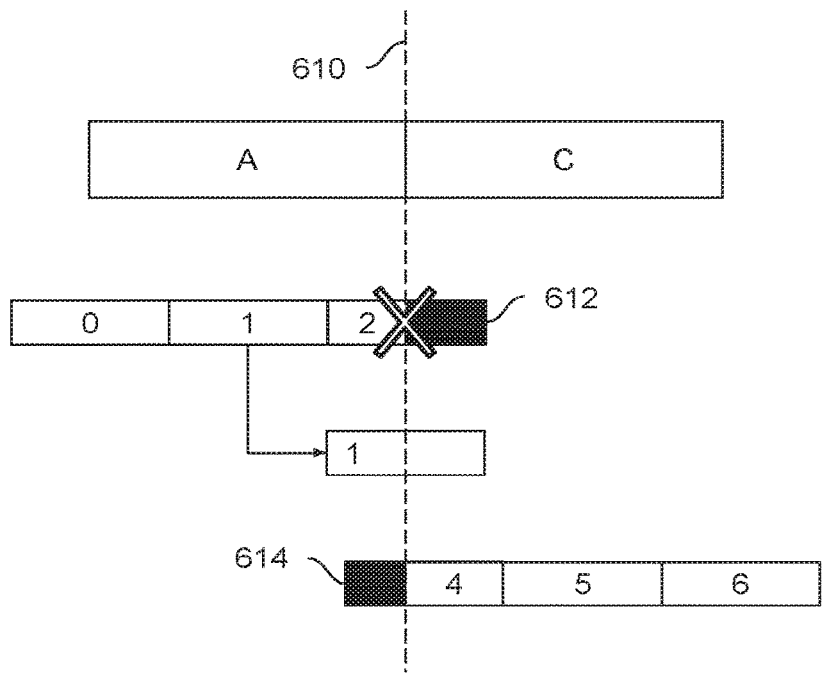
FIG. 10A illustrates how the playback application of FIG. 4 duplicates an audio frame to avoid playing back extraneous audio data, according to various embodiments.

FIG. 10A illustrates how the playback application of FIG. 4 duplicates an audio frame to avoid playing back extraneous audio data, according to various embodiments. In the example shown, playback application 436 analyzes audio frames 2 and 4 and determines that audio frame 2 should be dropped and the remaining audio frames should be shifted to implement a seamless audio transition. For example, playback application 436 could be configured to implement the techniques described above in conjunction with FIGS. 7A and 7C to selectively drop audio frames and then shift the remaining audio frames. However, playback application 436 could also determine that the current AV sync error cannot be increased without exceeding the maximum AV sync error, thereby disallowing any frames from being shifted.

In this situation, playback application 436 can replace audio frame 2 with audio frame 1, thereby eliminating extraneous audio 612 but also maintaining the current AV sync error. Playback application 436 can implement a similar technique to replace audio frame 4 with audio frame 5, if needed, thereby eliminating extraneous audio 614 but also maintaining the current AV sync error. The remaining audio frames can be crossfaded at transition 610, if crossfading is available. An advantage of this approach is that the duplicated audio frames include audio samples that are not acoustically divergent from other audio samples played in conjunction with transition 610, thereby reducing the playback of incorrect audio and/or audio artifacts.

Figure 10B:
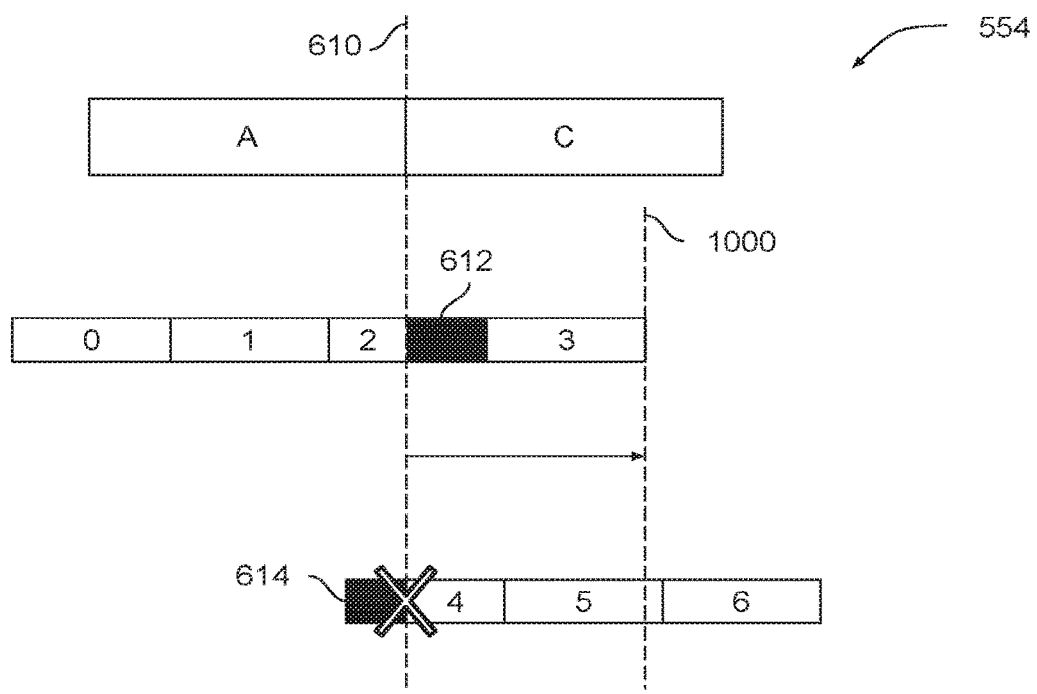
FIG. 10B illustrates how the playback application of FIG. 4 moves a transition between audio frames to avoid playing back extraneous audio data, according to various embodiments.

FIG. 10B illustrates how the playback application of FIG. 4 moves a transition between audio frames to avoid playing back extraneous audio data, according to various embodiments. In the example shown, playback application 436 analyzes audio frame 2 and determines, based on topology 450, that extraneous audio 612 is not acoustically divergent and need not be removed. Playback application 436 also analyzes audio frame 4 and determines that extraneous audio 614 is acoustically divergent but cannot be removed without causing the maximum AV sync error to be exceeded.

In this situation, playback application 436 can play an additional audio frame that physically follows audio frame 2 in memory (audio frame 3), effectively implementing an audio transition 1000 that occurs after the transition between video segments A and C. Audio frame 3 includes audio samples that are wholly associated with video segment B, although these audio samples are not acoustically divergent from those associated with the beginning portion of video segment C. Audio frame 4 can be dropped and audio frames 3 and 5 can be crossfaded (if crossfading is available). An advantage of this approach is that extraneous audio can be removed without disrupting the current AV sync error.

Referring generally to FIGS. 5A-10B, the disclosed techniques can be implemented with any technically feasible content and any corresponding topology. FIGS. 11A-12B illustrate how the foregoing techniques are applicable to a different type of topology than that discussed above in conjunction with FIGS. 5A-10B.

Mitigating Extraneous Audio in a Divergent Topology

Figure 11A:
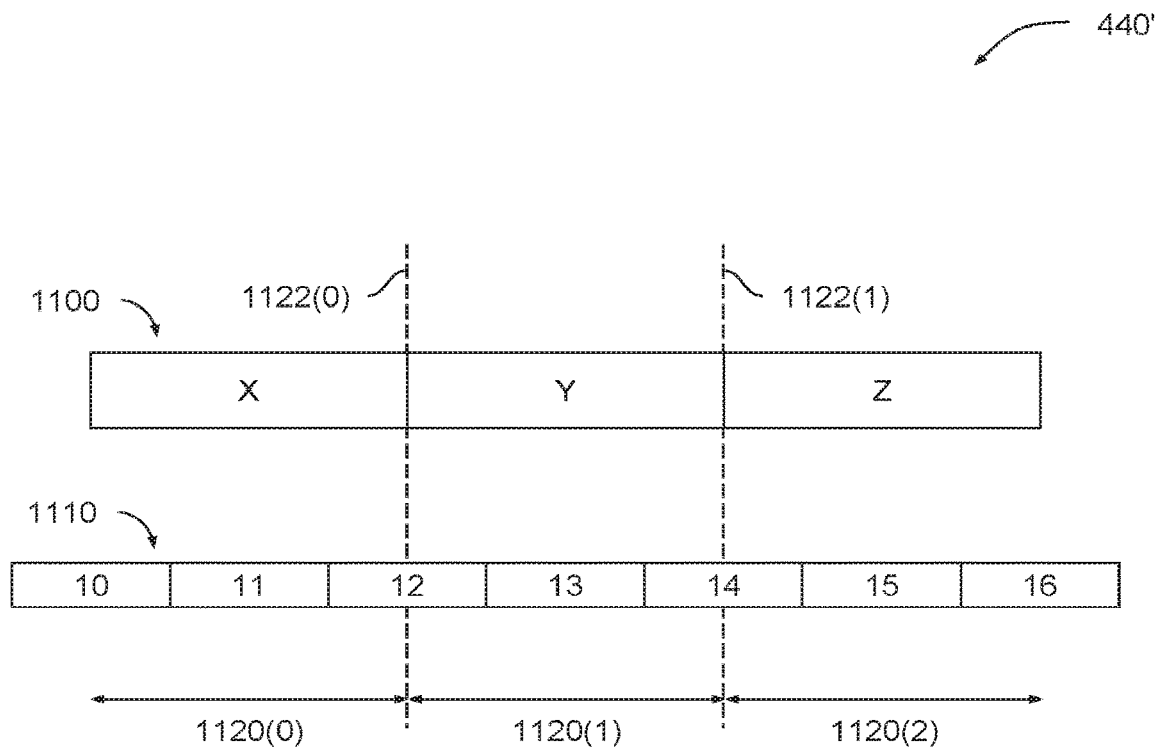
FIG. 11A illustrates how the content of FIG. 4 can be organized in memory, according to various other embodiments.

FIG. 11A illustrates how the content of FIG. 4 can be organized in memory, according to various other embodiments. As shown, content 440' includes video segments 1100 and audio frames 1110 organized into segments 1120. Video segments 1100 include video segments X, Y, and Z. Audio frames 1110 include audio frames 10, 11, 12, 13, 14, 15, and 16. Video segment X corresponds to audio frames 10, 11, and 12. Video segment Y corresponds to audio frames 12, 13, and 14. Video segment Z corresponds to audio frames 14, 15, and 16. Each video segment 1100 includes one or more video frames encoded with a particular video encoding standard. Each audio frame 1110 includes one or more encoded audio samples encoded with a particular audio encoding standard. Segment boundaries 1122 demarcate the end of one segment and the start of another. Audio frames 12 and 14 overlap segment boundaries 1122(0) and 1122(1), respectively.

Figure 11B:
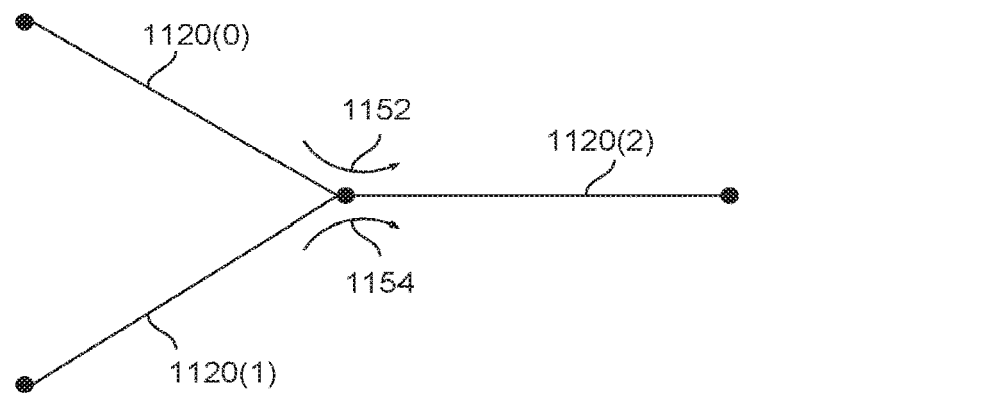
FIG. 11B is an alternative illustration of the topology of FIG. 4, according to various other embodiments.

FIG. 11B is an alternative illustration of the topology of FIG. 4, according to various other embodiments. As shown, topology 450' defines two different logical sequences that constrain the playback of content 440'. Logical sequence 1152 allows segment 1120(0) (including video segment X and corresponding audio) to be played back followed by segment 1120(2) (including video segment Y and corresponding audio). Logical sequence 1154 allows segment 1120(1) (including video segment Y and corresponding audio) to be played back followed by segment 1120(2) (including video segment Z and corresponding audio).

Segment 1120(0) immediately precedes segment 1120(2) in topology 450', as is shown, but segment 1120(0) does not immediately precede segment 1120(2) in memory, as shown in FIG. 11A. Accordingly, the logical sequence of segments 1120(0) and 1120(2) in topology 450' is inconsistent with the physical sequence of segments 1120(0) and 1120(2) in memory. Segment 1120(1) immediately precedes segment 1120(2) in topology 450', as is shown, and segment 1120(1) also immediately precedes segment 1120(2) in memory, as shown in FIG. 11A. Accordingly, the logical sequence of segments 1120(1) and 1120(2) in topology 450' is consistent with the physical sequence of segments 1120(1) and 1120(2) in memory. Playback across logical sequences 1152 and 1154 differs based on whether the logical sequence of the associated segments is consistent with the physical sequence of those segments, as described in greater detail below in conjunction with FIGS. 12A-12B.

Figure 12A:
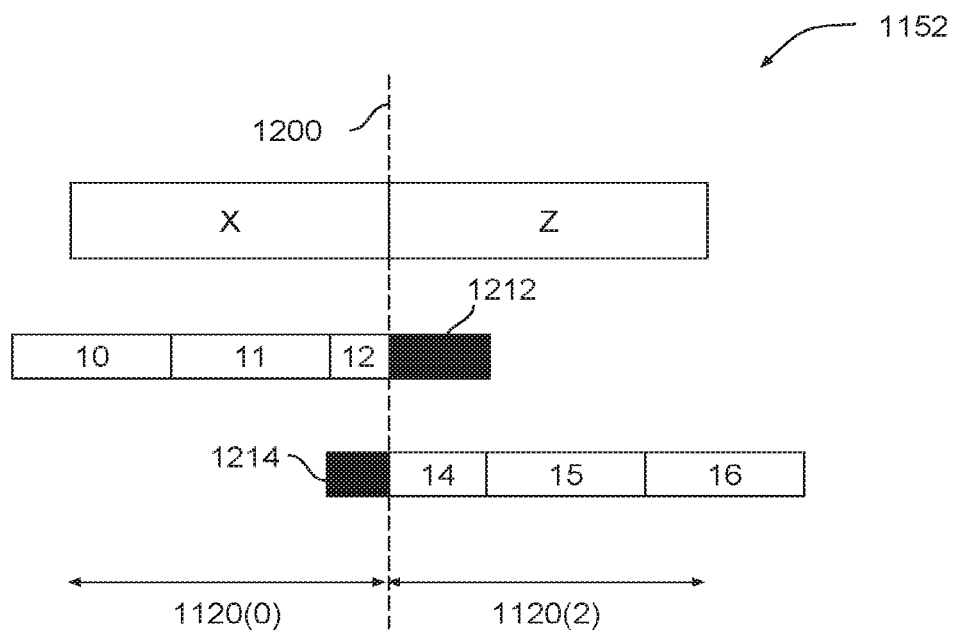
FIG. 12A illustrates a logical sequence of segments within the topology of FIG. 11B, according to various embodiments.

FIG. 12A illustrates a logical sequence of segments within the topology of FIG. 11B, according to various embodiments. As shown, logical sequence 1152 includes a transition 1200 between segments 1120(0) and 1120(2). During playback, playback application 436 plays video segment X in conjunction with audio frames 10, 11, and 12 followed by video segment Z in conjunction with audio frames 14, 15, and 16. Audio frame 12 overlaps segment boundary 1122(0) and includes audio samples derived from the beginning portion of segment 1120(1), shown as extraneous audio 1212. Audio frame 14 overlaps segment boundary 1122(1) and includes audio samples derived from the end portion of segment 1120(1), shown as extraneous audio 1214.

Playback application 436 can implement any of the techniques described above in conjunction with FIGS. 5A-10B to mitigate or reduce extraneous audio 1212 and 1214. For example, playback application 436 could selectively drop the longer of the two portions of extraneous audio and introduce a gap, implement a crossfade, or shift remaining audio frames, as described above in conjunction with FIGS. 7A-7C. Playback application 436 could also analyze topology 450' and determine whether any of extraneous audio 1112 and/or extraneous audio 1114 include audio samples that are acoustically divergent from the audio samples that are supposed to be played in conjunction with video segments X and/or Z. Playback application 436 could then selectively remove either or both of extraneous audio 1112 and 1114, as described above in conjunction with FIG. 9. In one embodiment, segments 1120 may be subject to an authoring constraint that segments sharing a common logical successor, such as segments 1120(0) and 1120(1), should include a final portion of audio having relatively similar audio waveforms. Playback application 436 could also duplicate one or more audio frames to replace either or both of audio frames 12 and 14 and/or shift the audio transition point, as described above in conjunction with FIGS. 10A-10B.

Figure 12B:
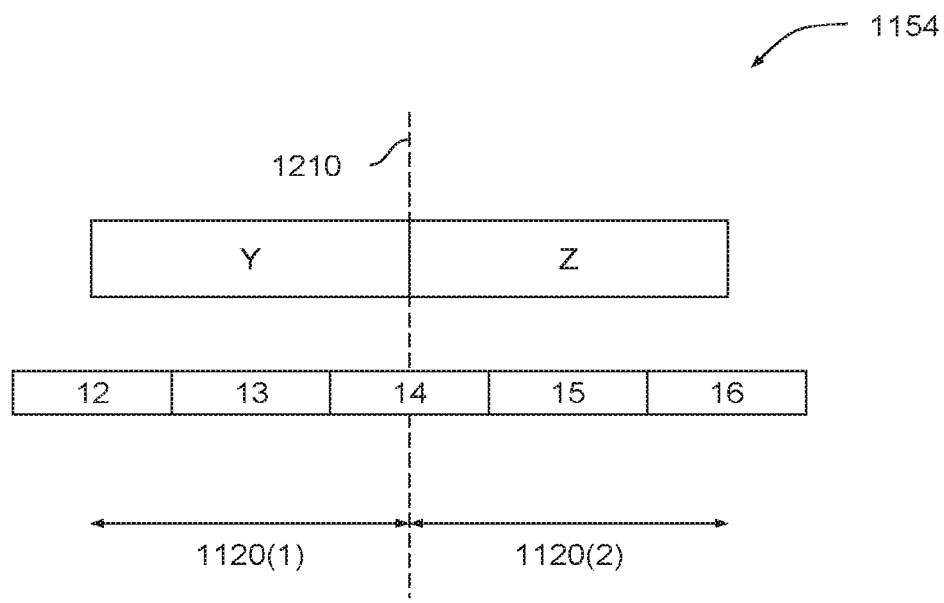
FIG. 12B illustrates another logical sequence of segments within the topology of FIG. 11B, according to various embodiments.

FIG. 12B illustrates another logical sequence of segments within the topology of FIG. 11B, according to various embodiments. As shown, logical sequence 1154 includes a transition 1210 between segments 1120(1) and 1120(2). During playback, playback application 436 plays video segment Y in conjunction with audio frames 12, 13, and 14 followed by video segment Z in conjunction with audio frames 14, 15, and 16. Audio frame 14 overlaps segment boundary 1120(1). However, because audio frame 14 is supposed to be played in conjunction with the last video frame of video segment Y and the first video frame of video segment Z, audio playback can proceed normally across transition 1210.

Referring generally to FIGS. 5A-12B, persons skilled in the art will understand how the techniques described in conjunction with these Figures can be applied to any technically feasible topology, including logically divergent topologies, logically convergent topologies, and any combination thereof.

Figure 13:
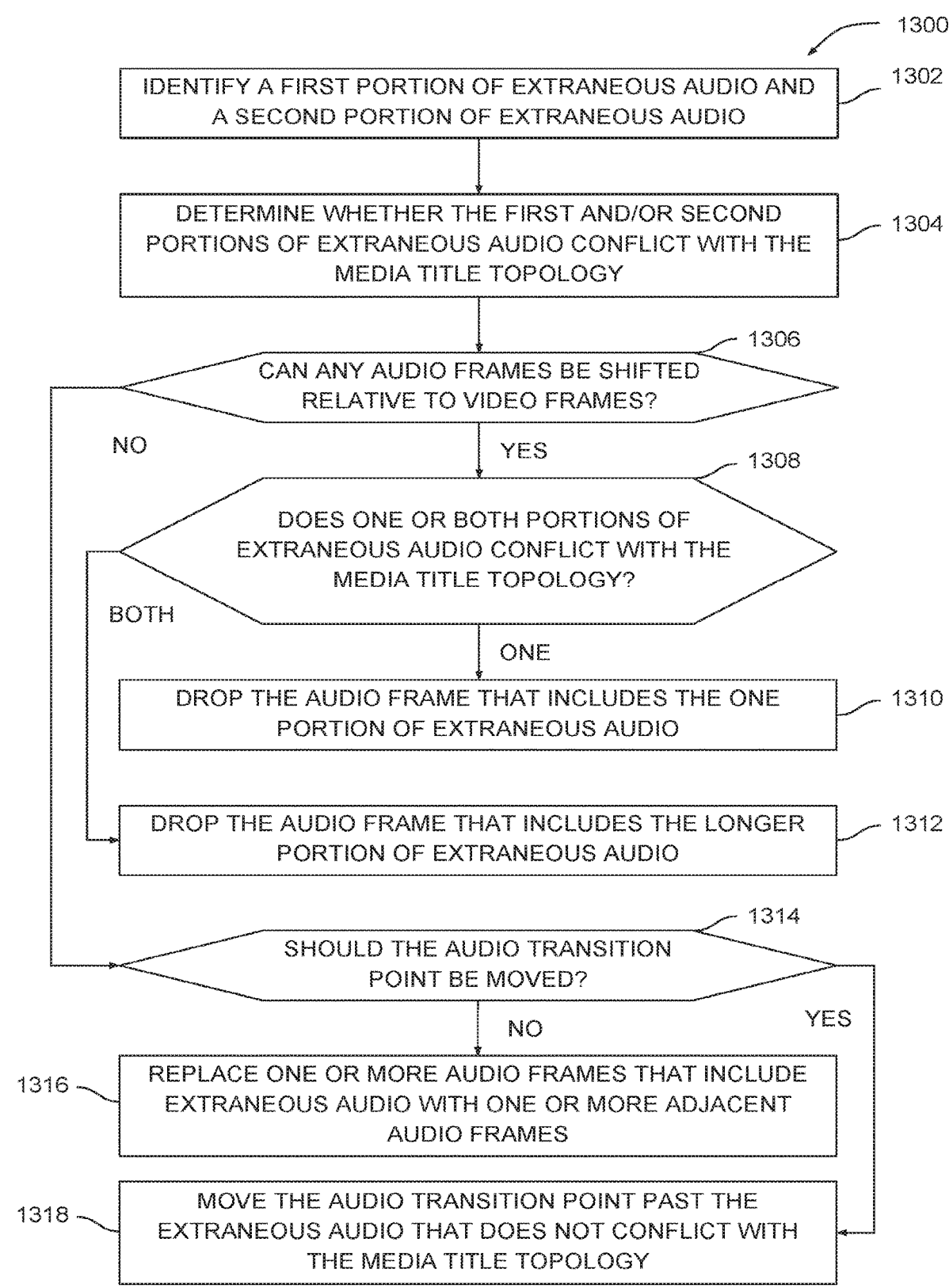
FIG. 13 is a flow diagram of method steps for reducing the playback of extraneous audio data, according to various other embodiments.

FIG. 13 is a flow diagram of method steps for reducing the playback of extraneous audio data, according to various other embodiments. Although the method steps are described in conjunction with the systems of FIGS. 1-12B, persons skilled in the art will understand that any system configured to perform the method steps, in any order, is within the scope of the present embodiments.

As shown, a method 1300 begins at step 1302, where playback application 436 identifies a first portion of extraneous audio and a second portion of extraneous audio. The first and second portions of extraneous audio can be included in segments associated with a media title. A given segment can include encoded video frames and/or audio frames. Playback application 436 can identify a portion of extraneous audio associated with a given audio frame by determining that the given audio frame overlaps a physical boundary between segments that reside sequentially in memory. Audio frames that overlap segment boundaries can be generated when an audio encoder groups together some raw audio samples associated with the end of a segment with other raw audio samples associated with the beginning of a segment.

At step 1304, playback application 436 determines which portions of extraneous audio conflict with a topology corresponding to the media title. The topology defines a set of segments and a set of allowable transitions between those segments. Playback of the media title can proceed between segments based on those allowable transitions and based on user input, among other things. During playback across a logical sequence of segments, playback application 436 can determine that a given portion of extraneous audio conflicts with the topology by determining that the given portion of extraneous audio should not be played in conjunction with that logical sequence of segments. The given portion of extraneous audio can include audio samples that are acoustically divergent from other audio samples that are supposed to be played in conjunction with the logical sequence of segments. As such, playback of the given portion of extraneous audio may sound incorrect.

At step 1306, playback application 436 determines whether any audio frames can be shifted relative to video frames. Playback application 436 maintains an accumulated AV sync error that defines the current temporal offset between video frames and audio frames. Playback application 436 can shift audio frames relative to video frames when doing so does not cause the AV sync error to exceed a maximum AV sync error. If at step 1306 playback application 436 determines that audio frames can be shifted relative to video frames, then the method 1300 proceeds to step 1308.

At step 1308, playback application 436 determines whether only one of the two portions of extraneous audio identified at step 1302 conflicts with the topology of the media title. In some cases, the various segments associated with the media title may be subject to an authoring constraint that segments having a common logical predecessor (or successor) in the topology should include an initial (or final) portion of audio having relatively similar audio waveforms. In some instances this approach allows one of the two portions of extraneous audio to be retained and the audio frame that includes the other portion of extraneous audio to be dropped.

If at step 1308 playback application 436 determines that only one portion of extraneous audio conflicts with the media title topology, then the method 1300 proceeds to step 1310. At step 1310, playback application 436 drops the audio frame that includes the one portion of extraneous audio. Because playback application 436 determines at step 1306 that audio frames can be shifted relative to video frames, the remaining audio frames can be shifted to implement a seamless audio transition. This technique is described above in conjunction with FIG. 9.

If at step 1308 playback application 436 determines that both portions of extraneous audio conflicts with the media title topology, then the method 1300 proceeds to step 1312. At step 1312, playback application 436 drops the audio frame that includes the longer portion of extraneous audio, in like fashion as described above in conjunction with FIG. 7A. Playback application 436 can then shift the remaining audio frames to implement a seamless audio transition.

Returning to step 1306, if playback application 436 determines at step 1306 that audio frames cannot be shifted relative to video frames, then the method 1300 proceeds to step 1314. At step 1314, playback application 436 determines whether an audio transition point should be moved ahead or behind a transition between corresponding video segments. If at step 1314 playback application 436 determines that the audio transition point should not be moved, then the method 1300 proceeds to step 1316.

At step 1316, playback application 436 replaces one or more audio frames that include extraneous audio with one or more adjacent audio frames. These adjacent audio frames generally include audio samples that do not conflict with the topology and can therefore be used as viable replacements for audio frames that should not be played. This technique is described above in conjunction with FIG. 10A.

If at step 1314 playback application 436 determines that the audio transition point should be moved, then the method 1300 proceeds to step 1318. At step 1318, playback application 436 moves the audio transition point past the extraneous audio that does not conflict with the media title topology. In doing so, playback application 436 causes an additional audio frame to be played that resides physically subsequent to the audio frame that includes the portion of extraneous audio. Playback application 436 can then drop the frame that includes the conflicting extraneous audio without disrupting the AV sync error. This technique is described above in conjunction with FIG. 10B.

Persons skilled in the art will understand that the method 1300 is applicable to any technically feasible topology, including divergent topologies such as topology 450 discussed above in conjunction with FIGS. 5B-10B as well as convergent topologies such as topology 450' discussed above in conjunction with FIGS. 11B-12B. The disclosed techniques can advantageously be applied to reduce playback of extraneous audio that may be disruptive to the viewing experience. In addition to these techniques, preprocessing engine 132 of FIG. 1 can modify raw audio samples associated with segments 520 in order preemptively mitigate extraneous audio, as described in greater detail below in conjunction with FIGS. 14A-15.

Modifying Raw Audio Samples to Remove Extraneous Audio

Figure 14A:
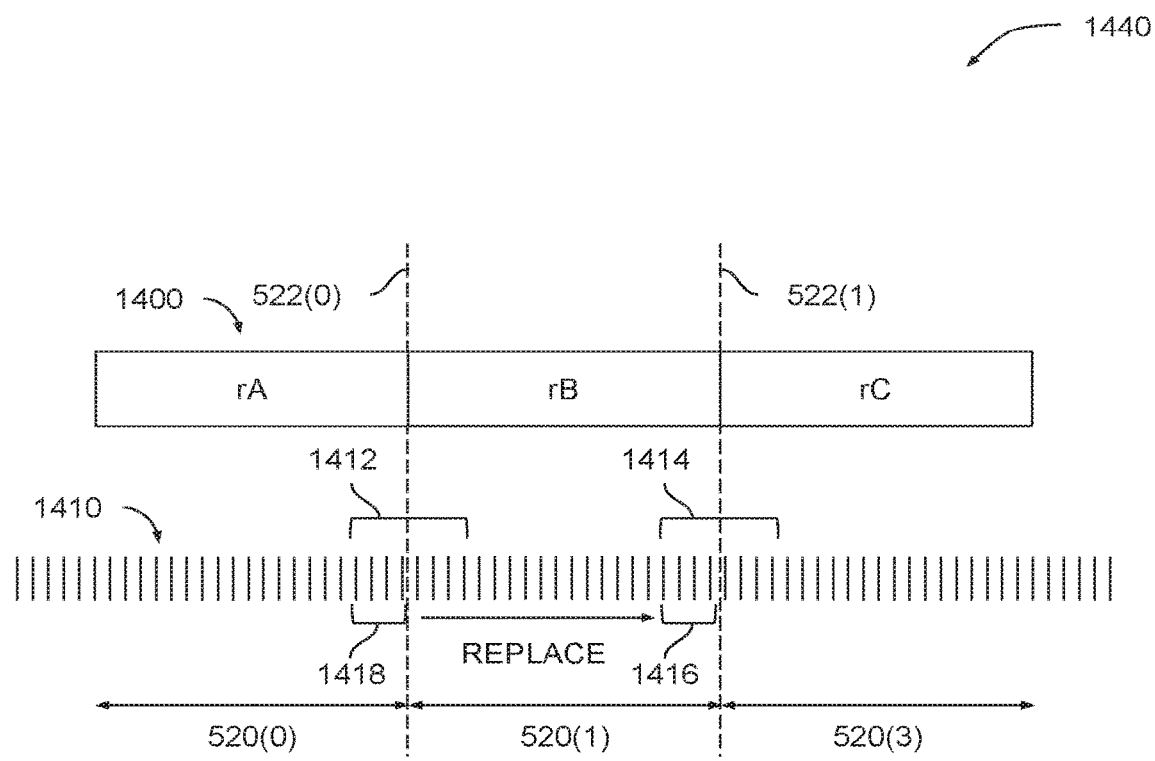
FIG. 14A illustrates raw media content that is encoded to generate the content of FIG. 4, according to various embodiments.

FIG. 14A illustrates raw media content that is encoded to generate the content of FIG. 4, according to various embodiments. As shown, raw content 1440 includes raw video frames 1400 and raw audio samples 1410. Raw video frames 1400 include raw video segments rA, rB, and rC. Raw video segments rA, rB, and rC can be encoded to generate video segments A, B, and C of FIG. 5A. Raw video segments rA, rB, and rC are organized into segments 520(0), 520(1), and 520(2) similarly to how video segments A, B, and C of FIG. 5A are organized into segments 520(0), 520(1), and 520(2). Segment boundaries 522(0) and 522(1) demarcate the ends of raw video segments rA and rB and the beginnings of raw video segments rB and rC, respectively.

Raw audio samples 1410 can be grouped together and encoded to generate audio frames 510 of FIG. 5A. As discussed, depending on audio encoder settings, groups of raw audio samples 1410 can be generated that overlap segment boundaries. In particular, group 1412 of raw audio samples overlaps segment boundary 522(0) and group 1414 of raw audio samples overlaps segment boundary 522(1). During audio encoding, groups 1412 and 1414 of raw audio samples can be encoded to generate audio frames 2 and 4, respectively, shown in FIG. 5A. Extraneous audio can be played when audio frames of specific segments 520 are logically sequenced according to topology 450 but are not physically sequenced in memory, as is shown in FIG. 14B.

Figure 14B:
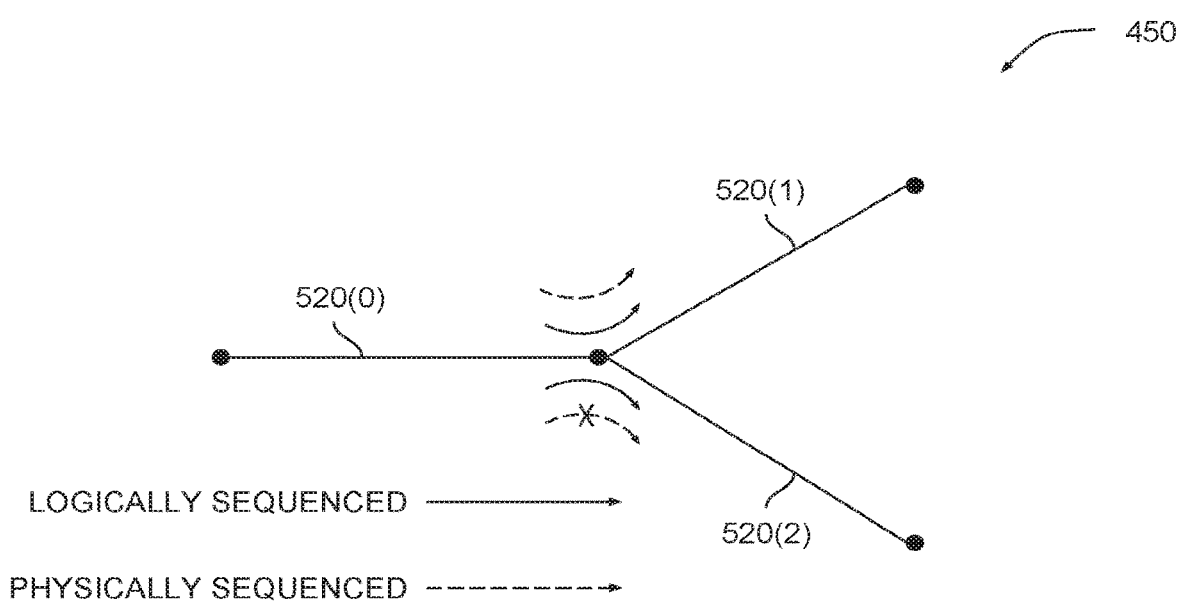
FIG. 14B illustrates various sequences of segments associated with the topology of FIG. 4, according to various embodiments.

Referring now to FIG. 14B, as shown, segments 520(0) and 520(1) are logically sequenced according to topology 450 and also physically sequenced in memory. Accordingly, audio frames associated with a transition between those segments typically do not include extraneous audio. Segments 520(0) and 520(2), by contrast, are logically sequenced according to topology 450 but not physically sequenced in memory. Consequently, audio frames associated with a transition between those segments may include extraneous audio. Referring generally to FIGS. 14A and 14B, any two segments 530 that are logically sequenced but not physically sequenced can lead to the occurrence of extraneous audio for the reasons discussed above in conjunction with FIGS. 5A-6B.

Preprocessing engine 132 addresses this issue by analyzing raw audio samples 1410 in conjunction with segment boundaries 1422 to identify groups 1412 and 1414 of raw audio samples 1410 prior to encoding. Preprocessing engine 132 then analyzes topology 450 and identifies any segments where the logically preceding segment is not the physically preceding segment. Audio samples that reside nearby in memory to such segments can potentially become extraneous audio when encoded into an audio frame that overlaps a segment boundary. Preprocessing engine 132 replaces these audio samples with other audio samples derived from the logically preceding segment. Because the replacement audio samples are derived from the logically preceding segment, those audio samples may not disrupt audio playback during transitions between the two segments.

In the example shown, preprocessing engine 132 determines that segment 520(2) is logically preceded by segment 520(0) but not physically preceded by segment 520(0). Preprocessing engine 132 identifies subset 1416 of raw audio samples that reside at the end of segment 520(1). Subset 1416 of raw audio samples can potentially be grouped together during encoding into an audio frame that is played back in conjunction with the first video frame of segment 520(2). In other words, subset 1416 can cause extraneous audio to be played in conjunction with incorrect video frames. Preprocessing engine 132 also identifies a subset 1418 of raw audio samples that reside at the end of segment 520(0) and includes the same number of raw audio samples as subset 1416. Preprocessing engine 132 replaces subset 1416 with subset 1418. Subsequently, during encoding, group 1414 of raw audio samples can be encoded into an audio frame that overlaps a segment boundary but does not include raw audio samples associated with a non-logically preceding segment. This approach facilitates a smooth audio transition between segments 520(0) and 520(2) and prevents the playback of extraneous audio associated with the end of segment 520(1). In one embodiment, this approach may be specifically applicable to situations where the topology is subject to the authoring constraint that the initial portions of any segments that share a logical predecessor include relatively similar audio waveforms.

An analogous technique to that described above can be applied to convergent topologies, such as topology 450' of FIG. 11B. With convergent topologies (or convergent portions of topologies), preprocessing engine 132 identifies segments where the logically subsequent segment in the topology is not the physically subsequent segment in memory. Preprocessing engine 132 then replaces a subset of samples from the end of the identified segment with a corresponding subset of samples from the beginning of the logically subsequent segment. In one embodiment, this approach may be specifically applicable to situations where the convergent topology is subject to the authoring constraint that the final portions of any segments that share a logical successor include relatively similar audio waveforms.

Figure 15:
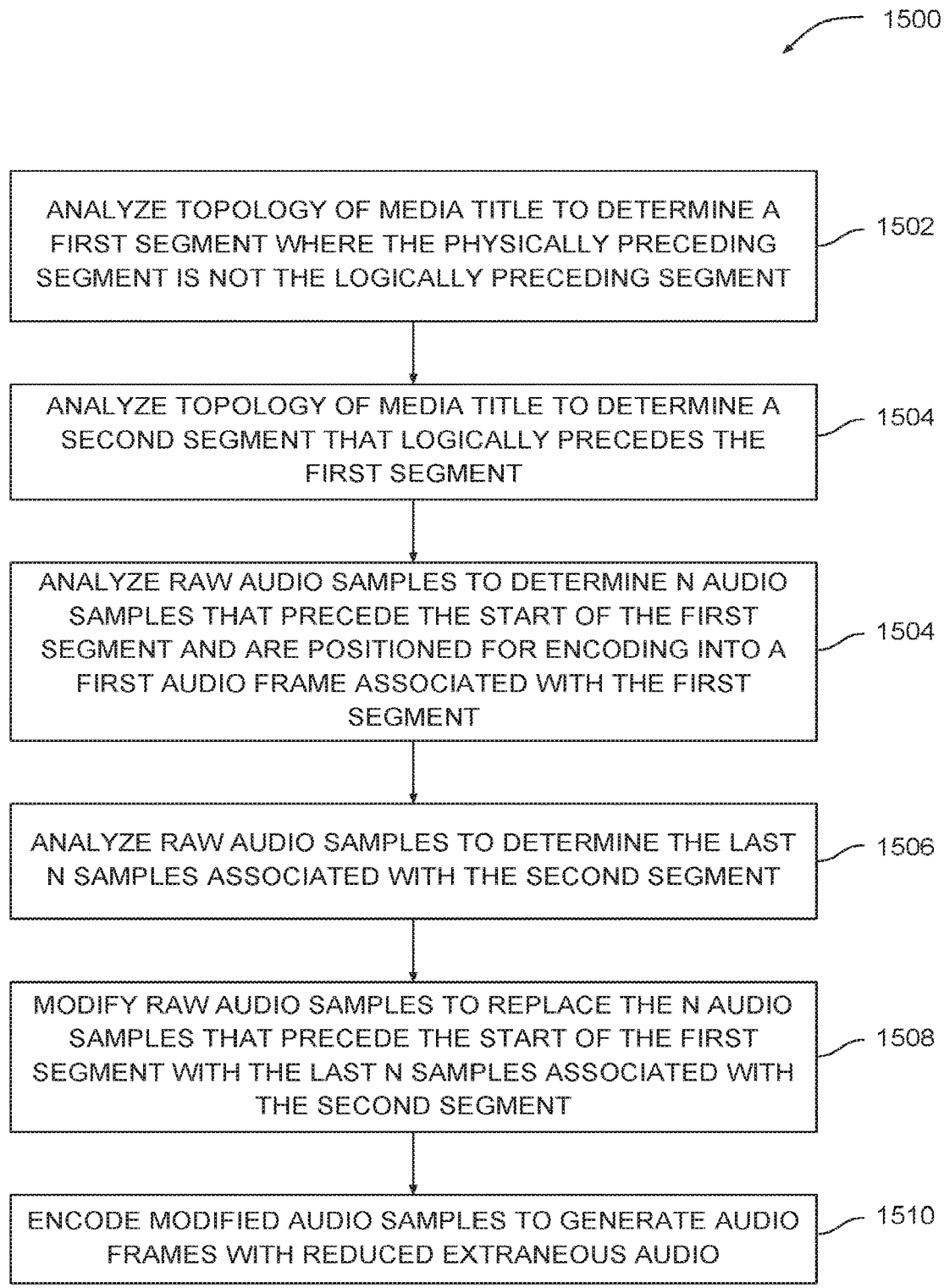
FIG. 15 is a flow diagram of method steps for modifying raw audio samples to reduce the playback of extraneous audio data, according to various embodiments.

FIG. 15 is a flow diagram of method steps for modifying raw audio samples to reduce the playback of extraneous audio data, according to various embodiments. Although the method steps are described in conjunction with the systems of FIGS. 1-14B, persons skilled in the art will understand that any system configured to perform the method steps, in any order, is within the scope of the present embodiments.

As shown, a method 1500 begins at step 1502, where preprocessing engine 132 of FIG. 1 analyzes the topology of a media title to determine a first segment where the physically preceding segment is not the logically preceding segment. For example, preprocessing engine 132 could analyze topology 450 and determine that segment 530(2) is logically preceded by segment 530(0) but physically preceded by segment 530(1) in memory. This arrangement of segments can lead to audio frames that overlap segment boundaries and potentially lead to the playback of extraneous audio.

At step 1502, preprocessing engine 132 analyzes the topology of the media title to determine a second segment that logically precedes the first segment. For example, preprocessing engine 132 could analyze topology 450 and determine that segment 530(0) logically precedes segment 530(2). The second segment may include raw audio samples that can be used to replace raw audio samples within the first segment corresponding to extraneous audio.

At step 1504, preprocessing engine 132 analyzes raw audio samples associated with the media title to determine N audio samples that precede the start of the first segment and are positioned for encoding into a first audio frame associated with the first segment. These N samples generally reside just before a segment boundary that demarcates the start of the first segment. For example, preprocessing engine 132 could determine subset 1416 of raw audio samples that reside just before segment boundary 522(1).

At step 1506, preprocessing engine 132 analyzes raw audio samples associated with the media title to determine the last N samples associated with the second segment. For example, processing engine 132 could identify subset 1418 of raw audio samples that reside at the end of segment 520(0). These audio samples can be used to replace the audio samples determined at step 1504.

At step 1508, preprocessing engine 132 modifies raw audio samples associated with the media title to replace the N audio samples that precede the start of the first segment with the last N samples associated with the second segment. Subsequently, during audio encoding, the audio encoder can generate an audio frame that overlaps the physical boundary demarcating the start of the first segment without incorporating raw audio samples associated with the physically preceding segment. Instead, the audio encoder generates the audio frame to incorporate the replacement samples from the logically preceding segment. During playback, this audio frame can be decoded with reduced extraneous audio.

In one embodiment, at step 1508, instead of replacing the samples preceding the start of the first segment preprocessing engine 132 may insert those N samples immediately before the first segment, where inserting the N samples causes subsequent samples to be delayed in time to accommodate the insertion of the N samples. This approach causes the audio file to become longer than the corresponding video and the locations and durations of all such inserted samples would be communicated to the client so that the AV sync can be appropriately modified, depending on the part of the media that is being rendered. The insertion approach addresses one disadvantage of the replacement approach, which is that although replacing audio samples removes extraneous audio for one logical transition, doing so may in some cases introduce additional extraneous audio for another logical transition, depending on the topology and frame timing. While the replacement technique enables an improvement, this technique may in some cases not remove all extraneous audio issues. The insertion technique may be able to address all such issues.

In sum, a playback application is configured to analyze audio frames associated with transitions between segments within a media title to identify one or more portions of extraneous audio. The playback application is configured to analyze the one or more portions of extraneous audio and then determine which of the one or more corresponding audio frames should be dropped. In doing so, the playback application can analyze a topology associated with the media title to determine whether any specific portions of extraneous audio are to be played outside of a logical ordering of audio samples set forth in the topology. These specific portions of extraneous audio are preferentially removed.

In addition to the foregoing techniques, various embodiments include a preprocessing engine that modifies the raw audio samples associated with the media title prior to encoding in order to avoid the occurrence of extraneous audio. The preprocessing engine analyzes the topology of the media title in conjunction with analyzing the physical layout of the media title in memory. Based on these analyses, the preprocessing engine identifies pairs of segments of the media title that are logically sequenced according to the topology but not physically sequenced in memory. The preprocessing engine analyzes a set of raw audio samples associated with one of the segments associated with a given pair of segments and then replaces a subset of those raw audio samples with another subset of raw audio samples associated with the other segment in the pair. In this manner, the preprocessing engine can preemptively avoid playback of extraneous audio.

At least one technological advantage of the disclosed techniques relative to the prior art is that portions of audio data that are not meant to be played back in conjunction with video frames derived from one or more segments of a media title can be more effectively reduced. Accordingly, situations where incorrect audio is output during playback of a given segment can be largely avoided, thereby enhancing the overall quality of the user experience when streaming media titles. Another technological advantage of the disclosed techniques relative to the prior art is that portions of audio data that are acoustically divergent from other portions of audio data can be more effectively reduced when analyzed relative to the logical topology of a given media title. Accordingly, situations where jarring and unexpected audio data are inadvertently output to the user can be largely avoided, thereby enhancing the overall streaming experience. Yet another technological advantage of the disclosed techniques relative to the prior art is that extraneous audio data can be preemptively removed from raw audio samples and replaced with non-extraneous audio. Accordingly, the occurrence of incorrect audio during playback of a given media title can be reduced, further improving the overall quality with which media titles can be streamed. These technological advantages represent one or more technological advancements relative to prior art approaches.

1. Some embodiments include a computer-implemented method, comprising identifying a first portion of audio data that should not be played back in conjunction with a first sequence of video segments associated with a media title, identifying a second portion of audio data that also should not be played back in conjunction with the first sequence of video segments, determining that the first portion of audio data has a greater playback duration than the second portion of audio data, and preventing the first portion of audio data from being played back in conjunction with the first sequence of video segments.

2. The computer-implemented method of clause 1, wherein preventing the first portion of audio data from being played back in conjunction with the first sequence of video segments comprises canceling one or more playback operations involving a first audio frame, wherein the first audio frame includes the first portion of audio data, and the first audio frame overlaps a physical boundary associated with a first video segment included in the first sequence of segments and a second video segment included in the first sequence of segments.

3. The computer-implemented method of any of clauses 1-2, further comprising performing a cross-fade operation between the second portion of audio data and a third portion of audio data that should be played back in conjunction with the first sequence of video segments.

4. The computer-implemented method of any of clauses 1-3, further comprising performing a transition operation between the second portion of audio data and a third portion of audio data that should be played back in conjunction with the first sequence of video segments.

5. The computer-implemented method of any of clauses 1-4, wherein a logical arrangement of video segments associated with the media title indicates that the first sequence of video segments includes a first video segment followed by a second video segment and that a second sequence of video segments includes the first video segment followed by a third video segment.

6. The computer-implemented method of any of clauses 1-5, wherein a physical arrangement of video segments associated with the media title indicates that the first video segment is followed by the third video segment in memory and that the third video segment is followed by the second video segment in memory.

7. The computer-implemented method of any of clauses 1-6, further comprising determining, based on the logical arrangement of video segments, that the first portion of audio data includes audio samples corresponding to the third video segment and that the second portion of audio data includes audio samples corresponding to both the second video segment and the third video segment.

8. The computer-implemented method of any of clauses 1-7, wherein preventing the first portion of audio data from being played back in conjunction with the first sequence of video segments comprises replacing the first portion of audio data with a third portion of audio data corresponding to either the first video segment or the second video segment 9.

10. The computer-implemented method of any of clauses 1-9, wherein the media title comprises a branching narrative media title, and wherein the logical arrangement of video segments corresponds to a plurality of different story arcs.

11. Some embodiments include a non-transitory computer-readable medium storing program instructions that, when executed by a processor, cause the process to perform the steps of identifying a first portion of audio data that should not be played back in conjunction with a first sequence of video segments associated with a media title, identifying a second portion of audio data that also should not be played back in conjunction with the first sequence of video segments, determining that the first portion of audio data has a greater playback duration than the second portion of audio data, and preventing the first portion of audio data from being played back in conjunction with a first transition between two segments included in the first sequence of video segments.

12. The non-transitory computer-readable medium of clause 11, wherein the step of preventing the first portion of audio data from being played back in conjunction with the first sequence of video segments comprises canceling one or more playback operations involving a first audio frame, wherein the first audio frame includes the first portion of audio data, and the first audio frame overlaps a first physical boundary that is associated with a first video segment included in the first sequence of segments and a second video segment included in the first sequence of segments.

13. The non-transitory computer-readable medium of any of clauses 11-12, wherein the first transition comprises a logical transition between the first video segment and a third video segment.

14. The non-transitory computer-readable medium of any of clauses 11-13, wherein a logical arrangement of video segments associated with the media title indicates that the first sequence of video segments includes a first video segment followed by a second video segment and that a second sequence of video segments includes the first video segment followed by a third video segment.

15. The non-transitory computer-readable medium of any of clauses 11-14, further comprising the step of determining, based on the logical arrangement of video segments, that the first portion of audio data includes audio samples corresponding to the third video segment and that the second portion of audio data includes audio samples corresponding to both the second video segment and the third video segment.

16. The non-transitory computer-readable medium of any of clauses 11-15, wherein the step of preventing the first portion of audio data from being played back in conjunction with the first sequence of video segments comprises replacing the first portion of audio data with a third portion of audio data corresponding to either the first video segment or the second video segment 17.

18. The non-transitory computer-readable medium of any of clauses 11-17, wherein a logical arrangement of video segments associated with the media title indicates that the first sequence of video segments includes a first video segment followed by a second video segment and that a second sequence of video segments includes a third video segment followed by the second video segment.

19. The non-transitory computer-readable medium of any of clauses 11-18, wherein a physical arrangement of video segments associated with the media title indicates that the first video segment is followed by the third video segment in memory and that the third video segment is followed by the second video segment in memory.

20. Some embodiments include a system, comprising a memory storing a playback application, and a processor that, when executing the playback application, is configured to perform the steps of identifying a first portion of audio data that should not be played back in conjunction with a first sequence of video segments associated with a media title, identifying a second portion of audio data that also should not be played back in conjunction with the first sequence of video segments, determining that the first portion of audio data has a greater playback duration than the second portion of audio data, and preventing the first portion of audio data from being played back in conjunction with a first transition between two segments included in the first sequence of video segments.

Any and all combinations of any of the claim elements recited in any of the claims and/or any elements described in this application, in any fashion, fall within the contemplated scope of the present embodiments and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow

What is claimed is:

1. A computer-implemented method for reducing playback of extraneous audio data, the method comprising:
    identifying a first portion of extraneous audio data that is not related to either a first segment of video data or a second segment of video data that are played back sequentially when playing back a media title;
    identifying a second portion of extraneous audio data that also is not related to either the first segment of video data or the second segment of video data;
    determining that at least one of the first portion of extraneous audio data or the second portion of extraneous audio data conflicts with a topology corresponding to the media title; and
    performing at least one operation that causes at least one of the first portion of extraneous audio data or the second portion of extraneous audio data to not be played back when playing back the first segment of video data and the second segment of video data.

* * * * *